US008107641B2

(12) United States Patent
Sakata et al.

(10) Patent No.: US 8,107,641 B2
(45) Date of Patent: Jan. 31, 2012

(54) COMMUNICATION SYSTEM AND CONTROL METHOD THEREFOR, PROGRAM, AND STORAGE MEDIUM

(75) Inventors: Tsuguhide Sakata, Machida (JP); Shigeki Sakurai, Yokohama (JP); Takayuki Komine, Kawasaki (JP); Naoki Umemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 12/466,273

(22) Filed: May 14, 2009

(65) Prior Publication Data

US 2009/0296953 A1 Dec. 3, 2009

(30) Foreign Application Priority Data

May 30, 2008 (JP) ................................ 2008-143623

(51) Int. Cl.
*H04B 3/00* (2006.01)
*H04R 5/00* (2006.01)
*H04R 29/00* (2006.01)

(52) U.S. Cl. ................ 381/80; 381/58; 381/59; 381/77; 381/119; 381/303; 381/304; 348/E5.008; 348/E5.103; 348/E5.105; 348/E5.114; 348/E5.122; 348/E5.128; 375/211; 375/219; 379/70; 700/94

(58) Field of Classification Search .................... 381/58, 381/59, 77, 80, 119, 303, 304; 348/E5.008, 348/E5.103, E5.105, E5.114, E5.122, E5.128; 375/211, 219; 379/70; 700/94
See application file for complete search history.

(56) References Cited

U.S. PATENT DOCUMENTS 5,023,730 A 6/1991 Sakata et al. .................... 360/48
5,515,430 A 5/1996 Ozawa et al. ................. 379/350
5,581,612 A 12/1996 Nishikawa .................... 379/387
5,586,172 A 12/1996 Sakurai et al. .................. 379/67
5,852,466 A 12/1998 Komine et al. ................. 348/15
6,167,031 A * 12/2000 Olofsson et al. .............. 370/252
6,275,144 B1 8/2001 Rumbaugh .................. 375/259
(Continued)

FOREIGN PATENT DOCUMENTS

JP 2005-175745 6/1989
(Continued)

OTHER PUBLICATIONS

Extended European Search Report dated Oct. 9, 2009, from corresponding European Application No. 09161519.5.

*Primary Examiner* — Dao H Nguyen
(74) *Attorney, Agent, or Firm* — Fitzpatrick, Cella, Harper & Scinto

(57) ABSTRACT

A communication system has a communication controller for multiplexing and transmitting a power supply voltage and an audio signal to be played back by a plurality of channels, and a plurality of communication adapters which start in response to reception of the multiplexed/transmitted power supply voltage, and play back the audio signal using a playback device. The communication controller includes an audio data modulation circuit configured to modulate audio data by shifting, based on a first modulation ratio, a modulation carrier clock for modulating the audio data and a data transmission rate for transmitting the audio data in order to set a command transmission frequency bandwidth, and a command data modulation circuit configured to modulate command data by shifting, based on a second modulation ratio, a modulation carrier clock for modulating the command data and a data transmission rate for transmitting the command data in the command transmission frequency bandwidth.

13 Claims, 22 Drawing Sheets

U.S. PATENT DOCUMENTS

| | | | | |
|---|---|---|---|---|
| 7,061,365 | B2 * | 6/2006 | Izumi | 340/3.1 |
| 7,613,233 | B2 * | 11/2009 | Hottinen | 375/219 |
| 2001/0008391 | A1 | 7/2001 | Yuasa | 370/489 |
| 2004/0202134 | A1 * | 10/2004 | Khawand | 370/332 |
| 2005/0152557 | A1 | 7/2005 | Sasaki et al. | 381/58 |
| 2008/0063216 | A1 * | 3/2008 | Sakata et al. | 381/80 |

FOREIGN PATENT DOCUMENTS

| | | |
|---|---|---|
| JP | 2001-223588 | 8/2001 |
| JP | 2002-217911 | 8/2002 |
| JP | 2005-175744 | 6/2005 |
| JP | 2005-198249 | 7/2005 |

* cited by examiner

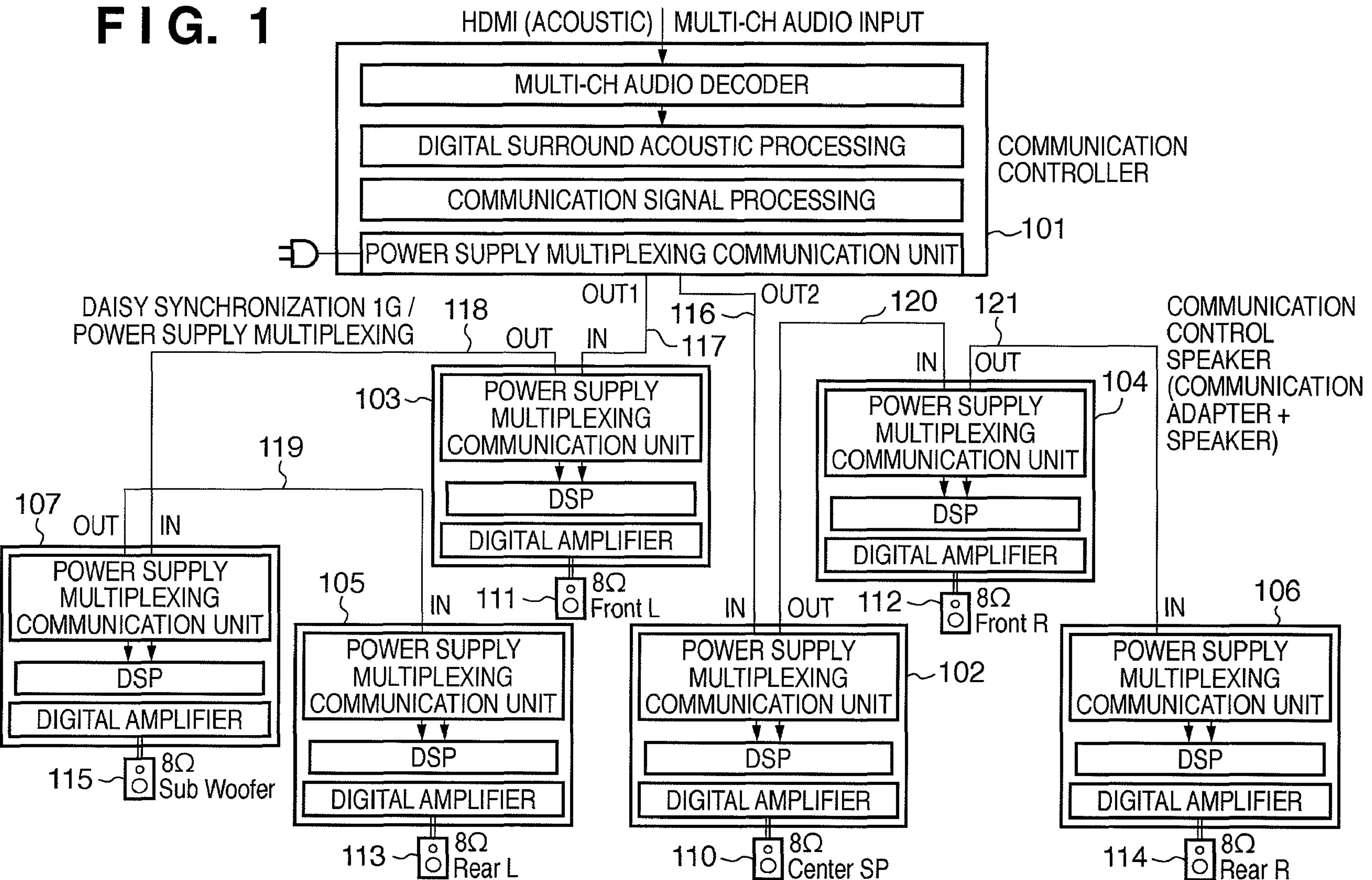
FIG. 1
HDMI (ACOUSTIC) | MULTI-CH AUDIO INPUT
MULTI-CH AUDIO DECODER
DIGITAL SURROUND ACOUSTIC PROCESSING
COMMUNICATION SIGNAL PROCESSING
POWER SUPPLY MULTIPLEXING COMMUNICATION UNIT
COMMUNICATION CONTROLLER
101
OUT1
OUT2
116
117
118
119
120
121
DAISY SYNCHRONIZATION 1G / POWER SUPPLY MULTIPLEXING
COMMUNICATION CONTROL SPEAKER (COMMUNICATION ADAPTER + SPEAKER)
102
103
104
105
106
107
IN
OUT
POWER SUPPLY MULTIPLEXING COMMUNICATION UNIT
DSP
DIGITAL AMPLIFIER
110
111
112
113
114
115
8Ω
Front L
Front R
Sub Woofer
Rear L
Center SP
Rear R

DAISY CONNECTOR
INPUT SIDE PLUG (MALE)

DAISY CONNECTOR
OUTPUT SIDE PLUG (FEMALE)

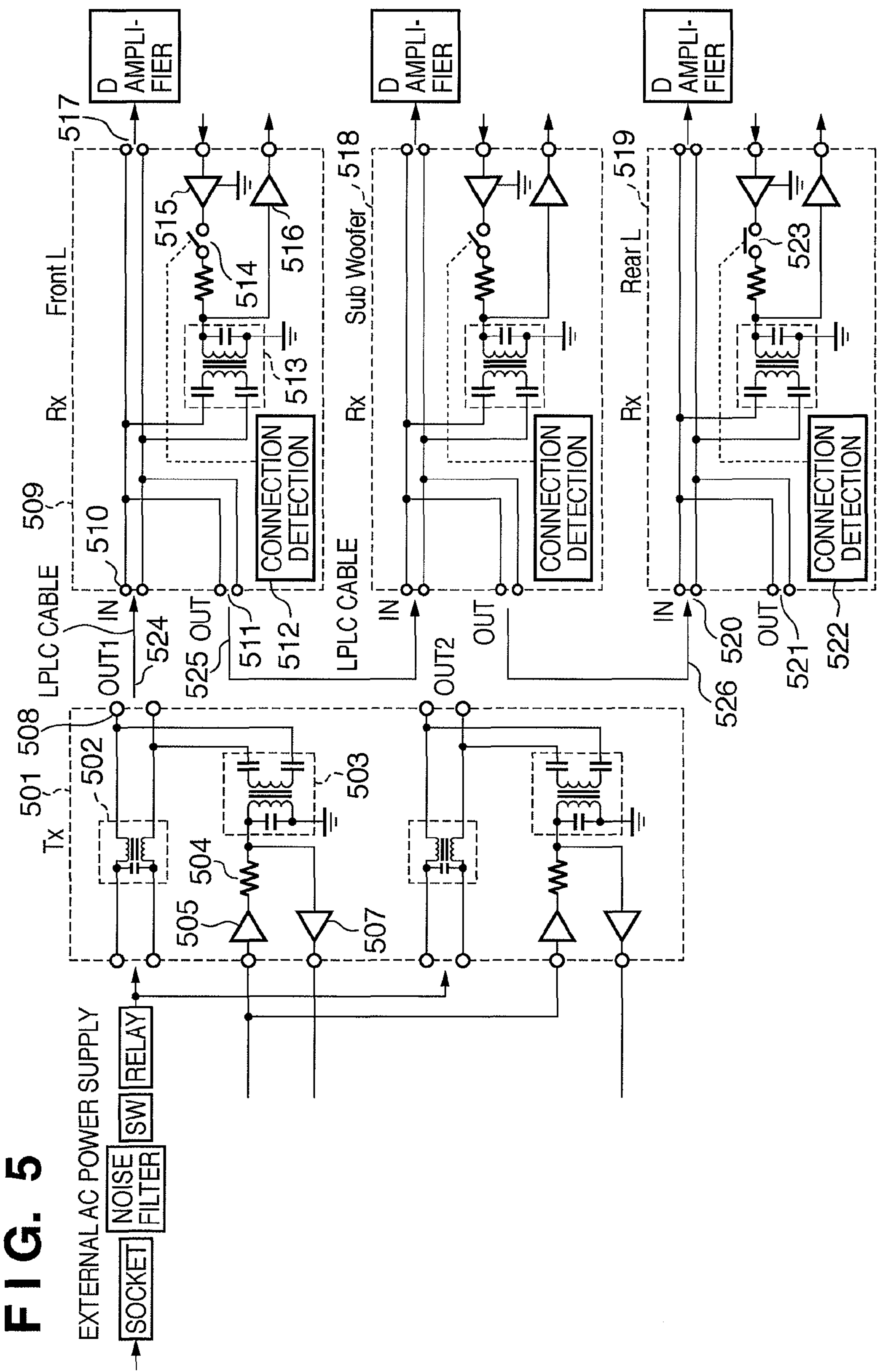
F I G. 5
EXTERNAL AC POWER SUPPLY
SOCKET
NOISE FILTER
SW
RELAY
Tx
501
502
503
504
505
507
508
OUT1
OUT2
LPLC CABLE
524
525
526
IN
OUT
509
510
511
512
513
514
515
516
517
518
519
520
521
522
523
Front L
Sub Woofer
Rear L
Rx
CONNECTION DETECTION
D AMPLI-FIER

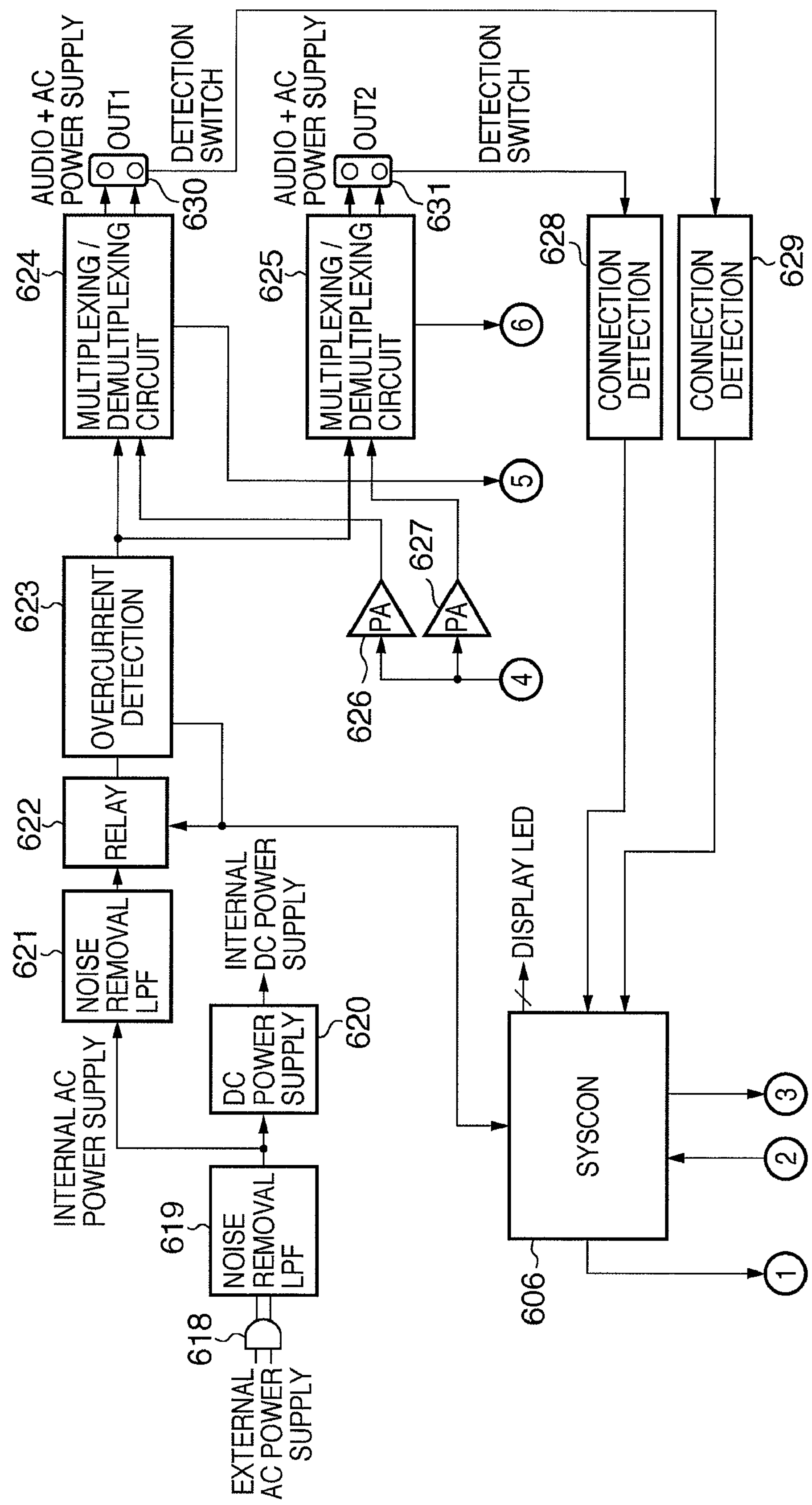
F I G. 6A
EXTERNAL AC POWER SUPPLY
618
619
NOISE REMOVAL LPF
INTERNAL AC POWER SUPPLY
DC POWER SUPPLY
620
INTERNAL DC POWER SUPPLY
621
NOISE REMOVAL LPF
622
RELAY
623
OVERCURRENT DETECTION
624
MULTIPLEXING / DEMULTIPLEXING CIRCUIT
625
MULTIPLEXING / DEMULTIPLEXING CIRCUIT
626
PA
627
PA
AUDIO + AC POWER SUPPLY
OUT1
630
DETECTION SWITCH
AUDIO + AC POWER SUPPLY
OUT2
631
DETECTION SWITCH
628
CONNECTION DETECTION
629
CONNECTION DETECTION
DISPLAY LED
SYSCON
606
1
2
3
4
5
6

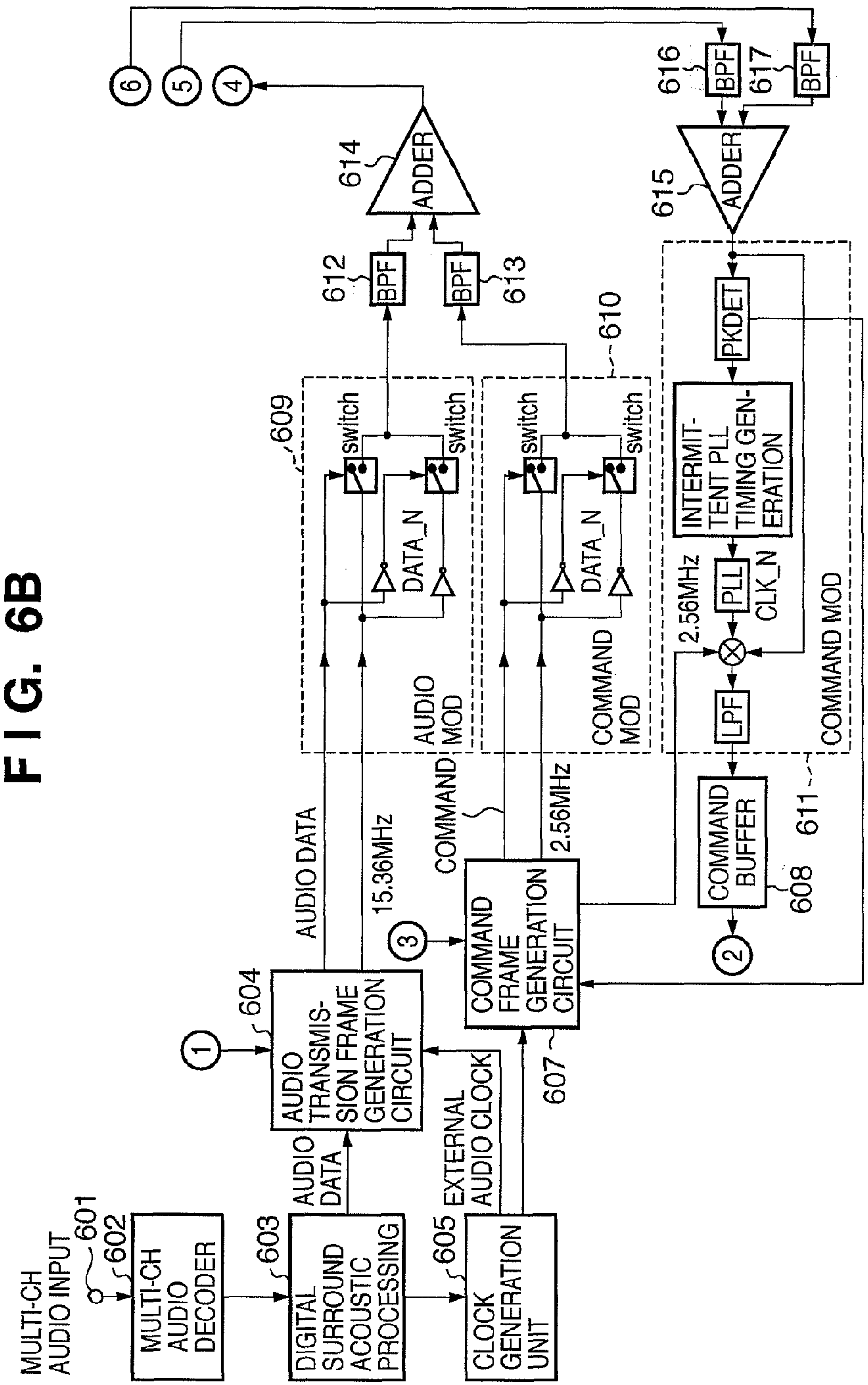

FIG. 6B
MULTI-CH AUDIO INPUT
601
602
MULTI-CH AUDIO DECODER
603
DIGITAL SURROUND ACOUSTIC PROCESSING
605
CLOCK GENERATION UNIT
AUDIO DATA
EXTERNAL AUDIO CLOCK
604
AUDIO TRANSMISSION FRAME GENERATION CIRCUIT
1
3
COMMAND FRAME GENERATION CIRCUIT
607
AUDIO DATA
15.36MHz
COMMAND
2.56MHz
609
switch
switch
DATA_N
AUDIO MOD
610
switch
switch
DATA_N
COMMAND MOD
612
BPF
613
BPF
614
ADDER
4
5
6
616
BPF
617
BPF
615
ADDER
PKDET
INTERMITTENT PLL TIMING GENERATION
PLL
CLK_N
2.56MHz
LPF
COMMAND MOD
611
COMMAND BUFFER
608
2

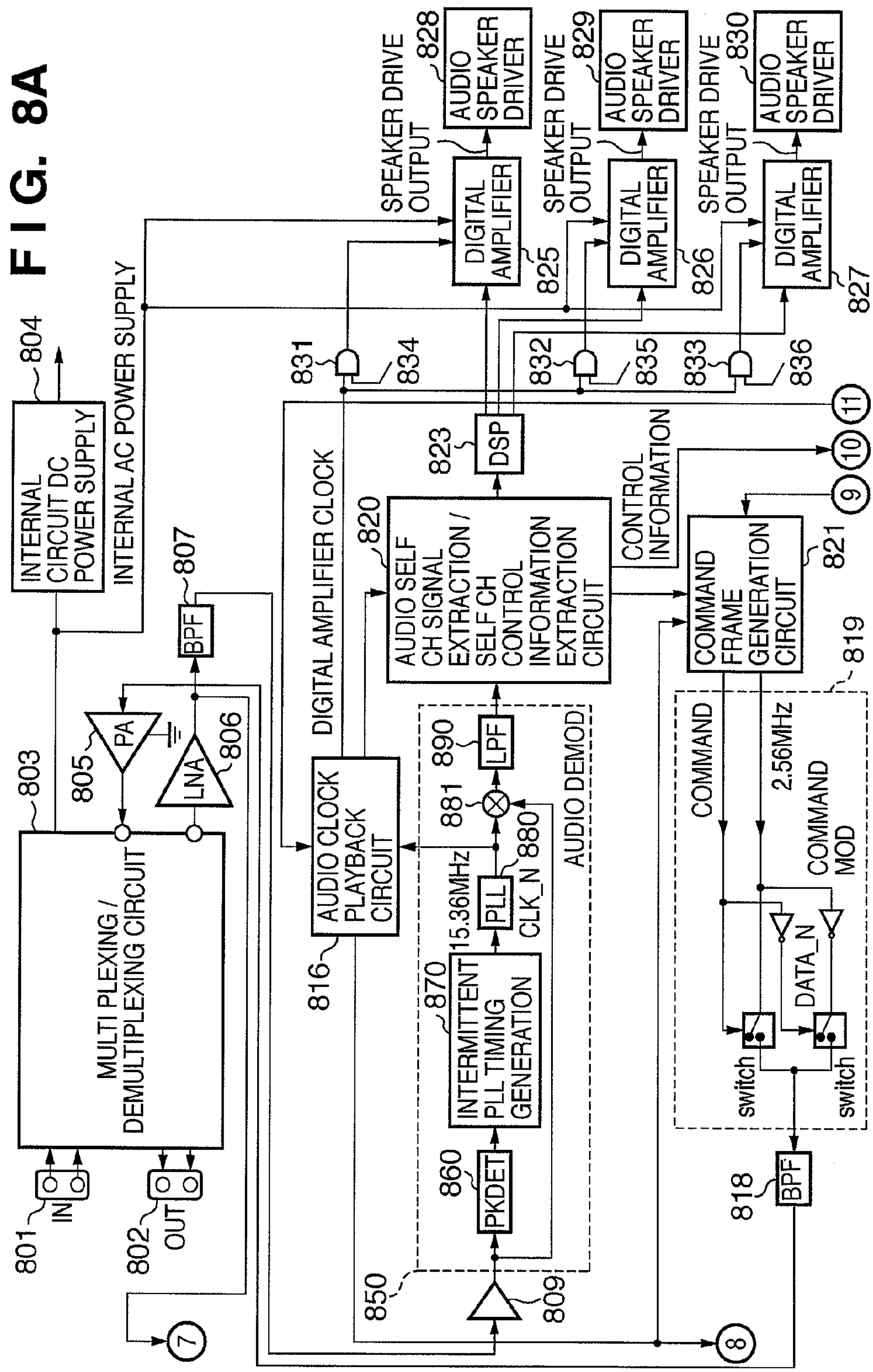
F I G. 8A
801
IN
802
OUT
MULTI PLEXING / DEMULTIPLEXING CIRCUIT
803
INTERNAL CIRCUIT DC POWER SUPPLY
804
INTERNAL AC POWER SUPPLY
805
PA
806
LNA
807
BPF
7
DIGITAL AMPLIFIER CLOCK
816
AUDIO CLOCK PLAYBACK CIRCUIT
850
809
860
PKDET
870
INTERMITTENT PLL TIMING GENERATION
15.36MHz
PLL
CLK_N
880
881
890
LPF
AUDIO DEMOD
820
AUDIO SELF CH SIGNAL EXTRACTION / SELF CH CONTROL INFORMATION EXTRACTION CIRCUIT
823
DSP
CONTROL INFORMATION
821
COMMAND FRAME GENERATION CIRCUIT
819
COMMAND
2.56MHz
COMMAND MOD
DATA_N
switch
switch
818
BPF
8
9
10
11
831
834
832
835
833
836
825
DIGITAL AMPLIFIER
826
DIGITAL AMPLIFIER
827
DIGITAL AMPLIFIER
SPEAKER DRIVE OUTPUT
SPEAKER DRIVE OUTPUT
SPEAKER DRIVE OUTPUT
828
AUDIO SPEAKER DRIVER
829
AUDIO SPEAKER DRIVER
830
AUDIO SPEAKER DRIVER

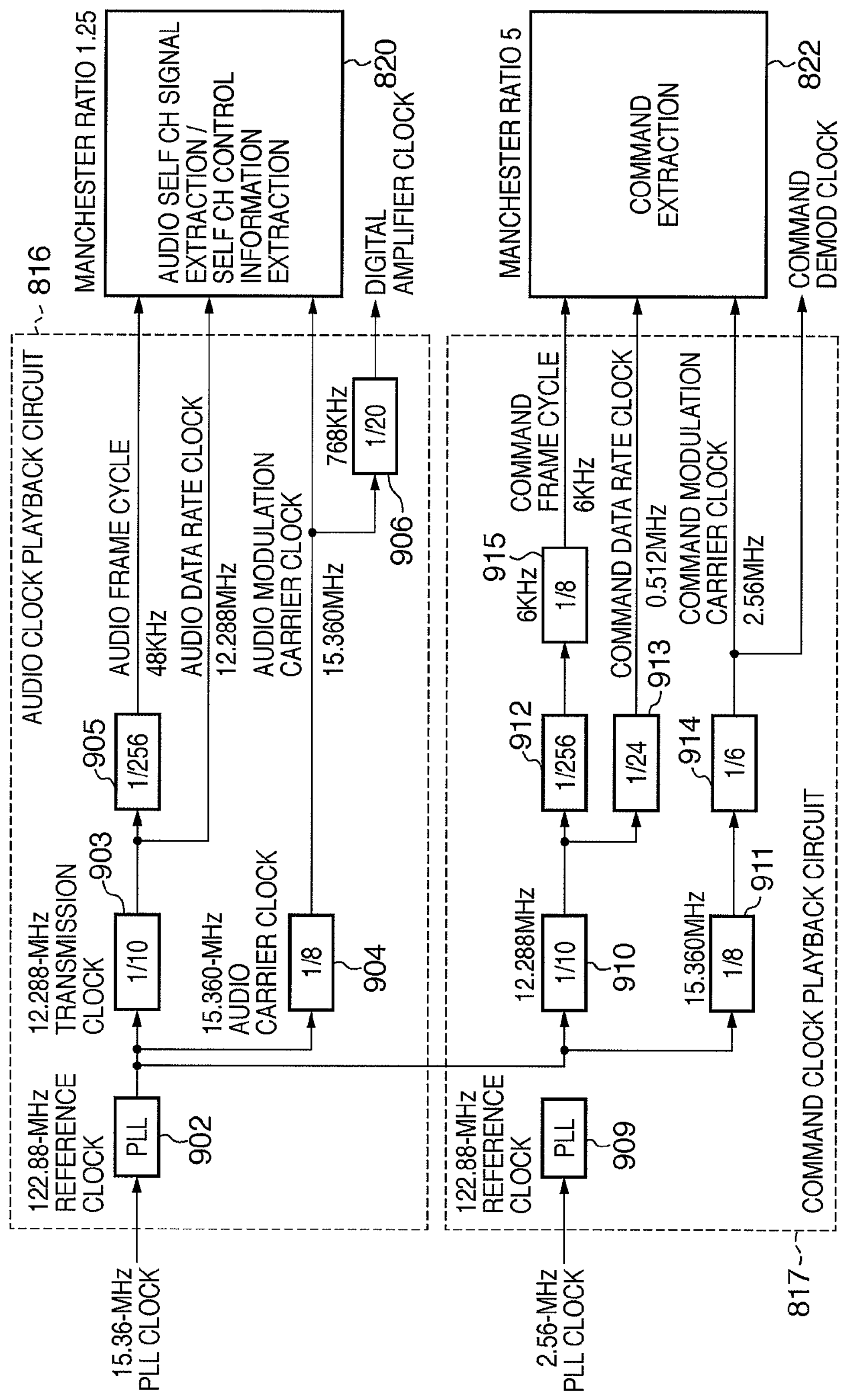
F I G. 9
AUDIO CLOCK PLAYBACK CIRCUIT
816
15.36-MHz PLL CLOCK
122.88-MHz REFERENCE CLOCK
PLL
902
12.288-MHz TRANSMISSION CLOCK
1/10
903
15.360-MHz AUDIO CARRIER CLOCK
1/8
904
1/256
905
AUDIO FRAME CYCLE
48KHz
AUDIO DATA RATE CLOCK
12.288MHz
AUDIO MODULATION CARRIER CLOCK
15.360MHz
768KHz
1/20
906
MANCHESTER RATIO 1.25
AUDIO SELF CH SIGNAL EXTRACTION / SELF CH CONTROL INFORMATION EXTRACTION
820
DIGITAL AMPLIFIER CLOCK
2.56-MHz PLL CLOCK
122.88-MHz REFERENCE CLOCK
PLL
909
12.288MHz
1/10
910
15.360MHz
1/8
911
1/256
912
1/24
913
1/6
914
6KHz
1/8
915
COMMAND FRAME CYCLE
6KHz
COMMAND DATA RATE CLOCK
0.512MHz
COMMAND MODULATION CARRIER CLOCK
2.56MHz
MANCHESTER RATIO 5
COMMAND EXTRACTION
822
COMMAND DEMOD CLOCK
COMMAND CLOCK PLAYBACK CIRCUIT
817

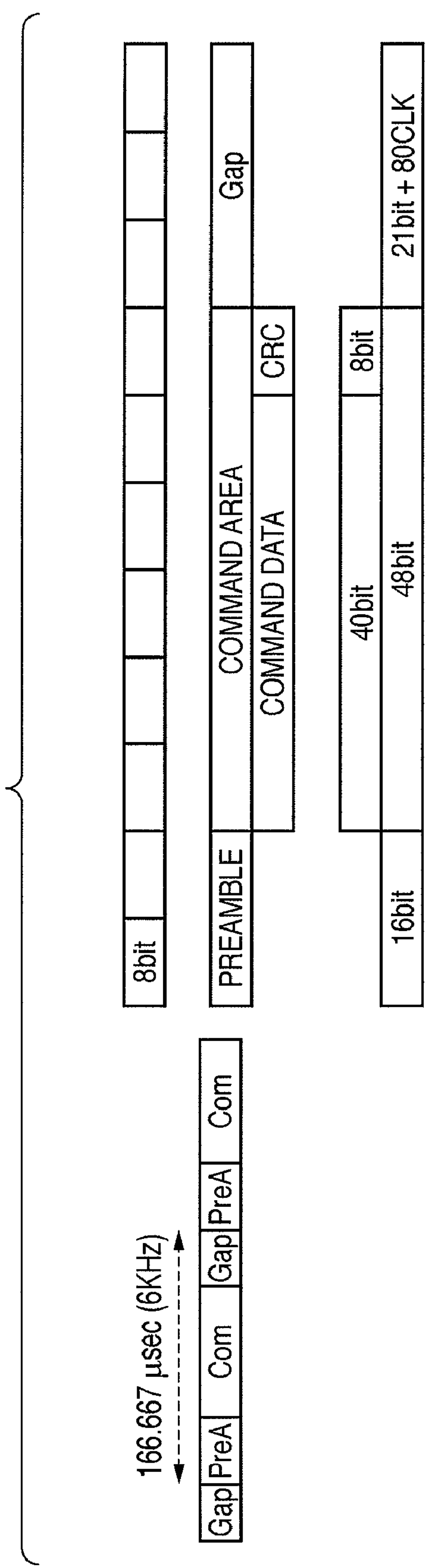
F I G. 11
166.667 μsec (6KHz)
Gap
PreA
Com
Gap
PreA
Com
8bit
PREAMBLE
COMMAND AREA
Gap
COMMAND DATA
CRC
40bit
8bit
16bit
48bit
21bit + 80CLK 20.833 μsec (48KHz)
CONTROL INFORMATION, CRC
Gap
Pre
Data
Gap
Pre
Data
Com
8bit
AUDIO 24bit × 8ch
CRC
Gap
CONTROL INFORMATION
PREAMBLE
8bit
192bit (24Byte)
32bit
16bit
8bit

FIG. 14

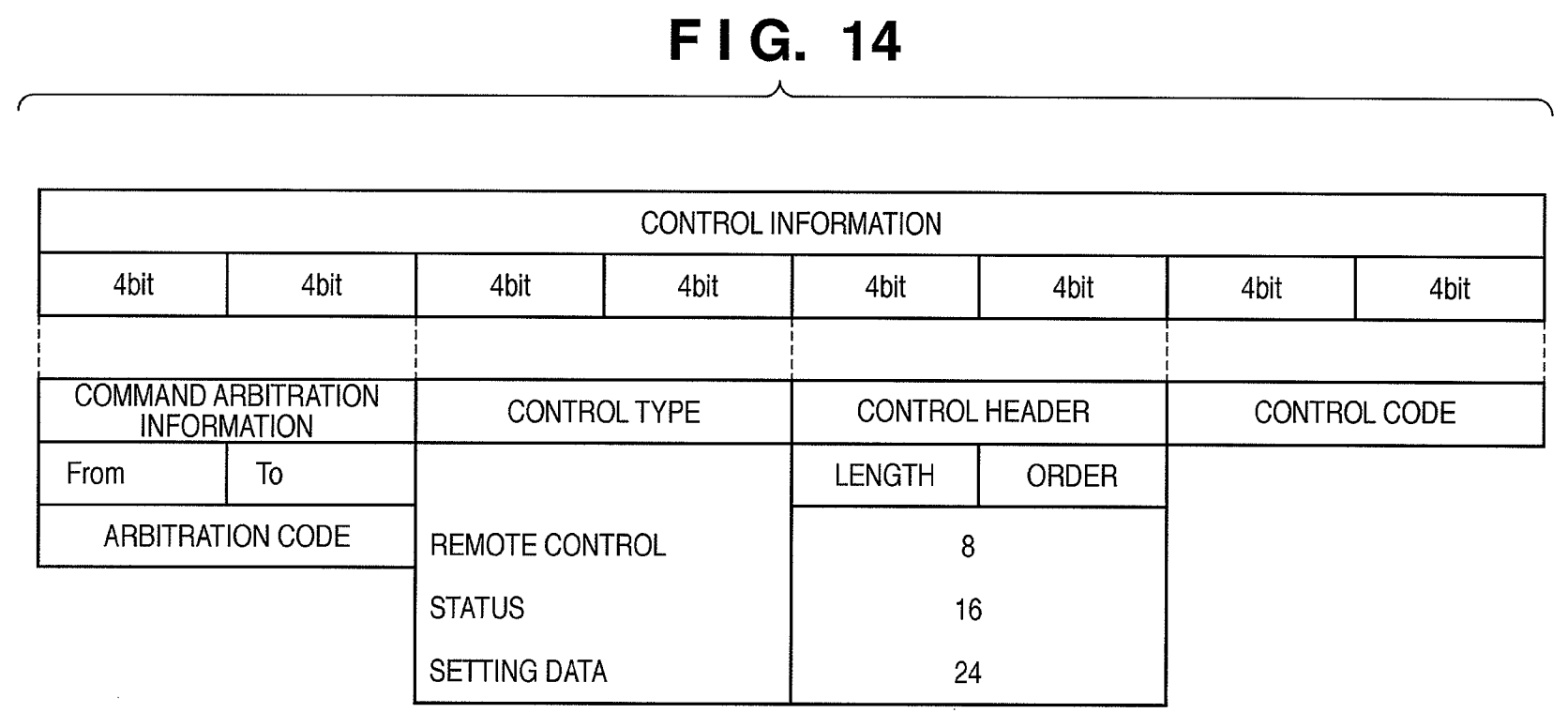

| CONTROL INFORMATION | | | | | | | |
|---|---|---|---|---|---|---|---|
| 4bit | 4bit | 4bit | 4bit | 4bit | 4bit | 4bit | 4bit |
| COMMAND ARBITRATION INFORMATION | | CONTROL TYPE | | CONTROL HEADER | | CONTROL CODE | |
| From | To | REMOTE CONTROL<br>STATUS<br>SETTING DATA | | LENGTH | ORDER | | |
| ARBITRATION CODE | | | | 8<br>16<br>24 | | | |

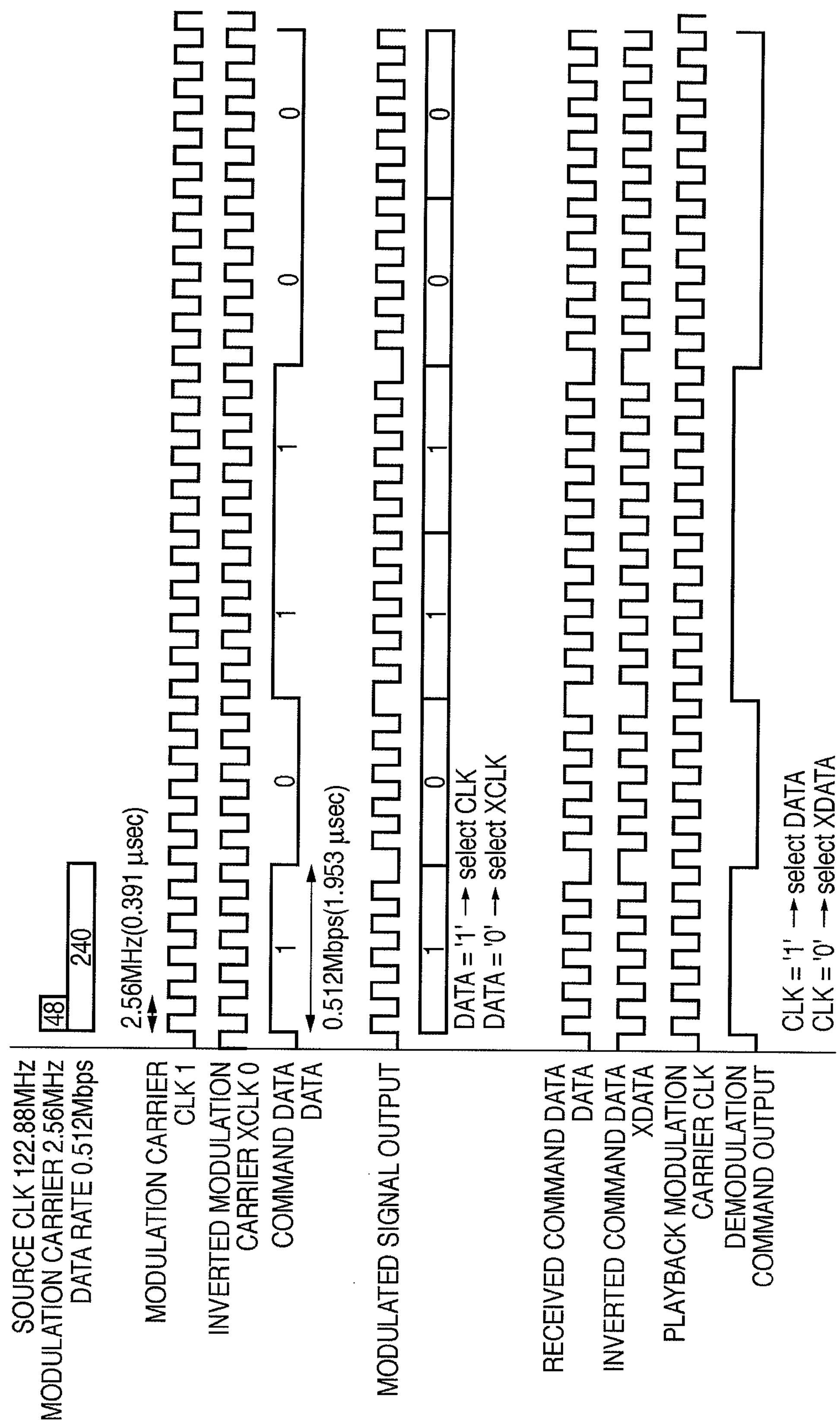
F I G. 15
SOURCE CLK 122.88MHz
MODULATION CARRIER 2.56MHz
DATA RATE 0.512Mbps
48
240
2.56MHz(0.391 μsec)
MODULATION CARRIER
CLK 1
INVERTED MODULATION
CARRIER XCLK 0
COMMAND DATA
DATA
1 0 1 1 0 0
0.512Mbps(1.953 μsec)
MODULATED SIGNAL OUTPUT
1 0 1 1 0 0
DATA = '1' → select CLK
DATA = '0' → select XCLK
RECEIVED COMMAND DATA
DATA
INVERTED COMMAND DATA
XDATA
PLAYBACK MODULATION
CARRIER CLK
DEMODULATION
COMMAND OUTPUT
CLK = '1' → select DATA
CLK = '0' → select XDATA

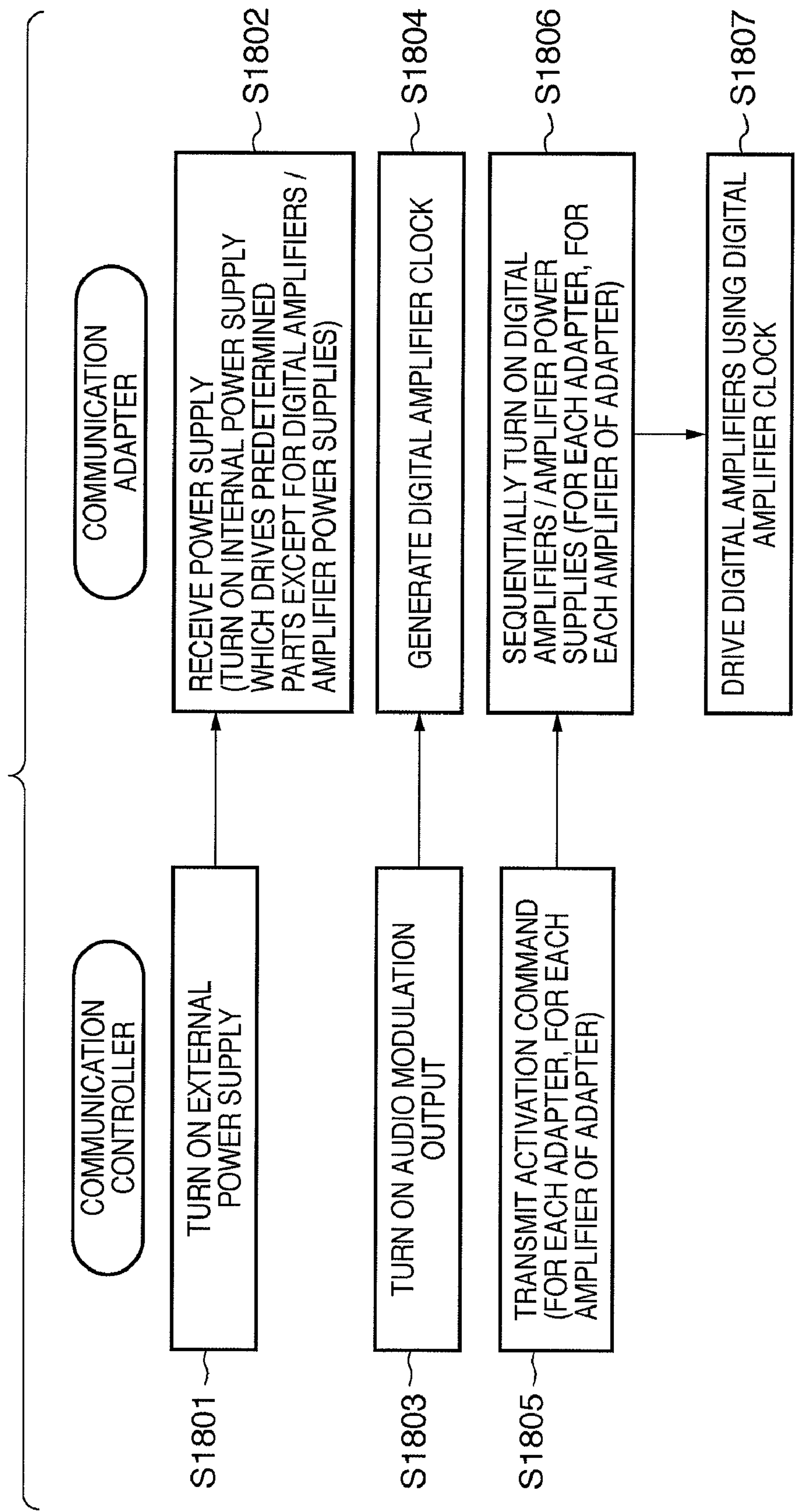
FIG. 18
COMMUNICATION CONTROLLER
COMMUNICATION ADAPTER
S1801
TURN ON EXTERNAL POWER SUPPLY
S1802
RECEIVE POWER SUPPLY (TURN ON INTERNAL POWER SUPPLY WHICH DRIVES PREDETERMINED PARTS EXCEPT FOR DIGITAL AMPLIFIERS / AMPLIFIER POWER SUPPLIES)
S1803
TURN ON AUDIO MODULATION OUTPUT
S1804
GENERATE DIGITAL AMPLIFIER CLOCK
S1805
TRANSMIT ACTIVATION COMMAND (FOR EACH ADAPTER, FOR EACH AMPLIFIER OF ADAPTER)
S1806
SEQUENTIALLY TURN ON DIGITAL AMPLIFIERS / AMPLIFIER POWER SUPPLIES (FOR EACH ADAPTER, FOR EACH AMPLIFIER OF ADAPTER)
S1807
DRIVE DIGITAL AMPLIFIERS USING DIGITAL AMPLIFIER CLOCK

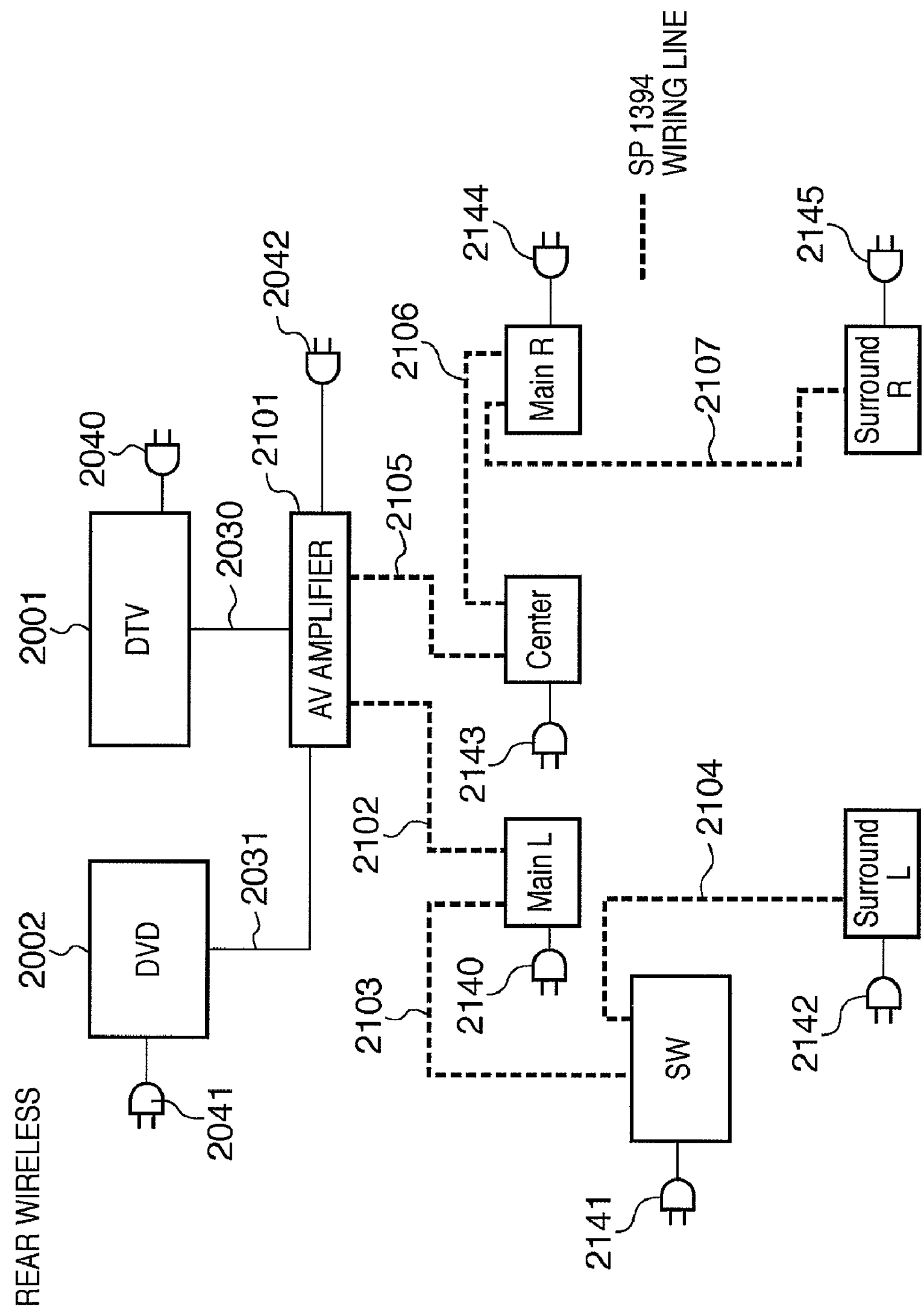
F I G. 21
REAR WIRELESS
DTV
DVD
AV AMPLIFIER
Main L
Main R
Center
SW
Surround L
Surround R
SP 1394 WIRING LINE
2001
2002
2030
2031
2040
2041
2042
2101
2102
2103
2104
2105
2106
2107
2140
2141
2142
2143
2144
2145

COMMUNICATION SYSTEM AND CONTROL METHOD THEREFOR, PROGRAM, AND STORAGE MEDIUM

BACKGROUND OF THE INVENTION

1. Field of the Invention

The present invention relates to a communication technique for synchronously transmitting data from a single signal source to multi-channel playback devices.

2. Description of the Related Art

A multi-channel speaker system (to be abbreviated as "multi-CH SP system" hereinafter) as the prior art is used together with a digital television, DVD player, AV amplifier, and the like to form a home theater. A wiring example of a typical home theater has an arrangement shown in FIG. 20. Reference numeral 2001 denotes a digital television (to be abbreviated as "DTV" hereinafter); reference numeral 2002, a DVD player (to be abbreviated as "DVD" hereinafter); reference numeral 2003, an audio video amplifier (to be abbreviated as "AV amplifier" hereinafter); and reference numerals 2004 to 2009, six speakers (SPs) which form a 5.1CH surround system. For example, reference numeral 2004 denotes a subwoofer (to be abbreviated as "SW" hereinafter); reference numeral 2005, a center SP; reference numeral 2006, an L-channel main SP; reference numeral 2007, an R-channel main SP; reference numeral 2008, an L-channel rear SP; and reference numeral 2009, an R-channel rear SP.

As for the wiring among these devices, reference numeral 2030 denotes a wiring line which connects the AV amplifier 2003 and DTV 2001. Typically, the wiring line 2030 comprises an HDMI cable used to connect the HDMI output of the AV amplifier 2003 to the HDMI input of the DTV 2001. Reference numeral 2031 denotes an HDMI cable which connects the HDMI output of the DVD 2002 to the HDMI input of the AV amplifier 2003, typically. Reference numerals 2032 to 2037 denote SP cables connected from the AV amplifier 2003 to the six SPs, respectively. On the other hand, as for power supply wiring, reference numeral 2040 denotes an AC power supply line of the DTV 2001; reference numeral 2041, a power supply line of the DVD; and reference numeral 2042, a power supply line of the AV amplifier.

FIG. 20 is a block diagram showing the prior art of full wired wiring using analog speaker cables. In this case, the SPs are wired by six SP cables from the AV amplifier. These SP cables impose a heavy load on the user since they must be wired in consideration of the plus and minus polarities, R and L (right and left) channel differences, and the like.

How to simplify many, complicated SP wiring lines from the AV amplifier is the first issue (wiring simplification).

The second issue (digitization) of the present invention is to prevent performance degradation due to analog connection. In particular, since the wiring line length to each rear speaker is long, the rear speaker is vulnerable to performance degradation due to the resistance of the connected SP cable.

Furthermore, the following problem potentially exists. That is, since it is difficult for the user to notice that any wiring line is disconnected from a corresponding speaker, he/she may be unaware that the fidelity of a playback sound is, in fact, lost. It is possible to improve the convenience by notifying the user of the status of each speaker such as status information indicating, for example, a standby status or conditions including a failure. That is, the third issue is to make it possible to grasp and control the status of each speaker on the control side such as the AV amplifier side.

As a method of solving the first to third issues, a method of connecting a playback audio signal from an optical disk player to playback devices including SPs by, for example, IEEE1394 via a network has been proposed, as described in Japanese Patent Laid-Open Nos. 2001-223588 and 2002-217911.

Also, Japanese Patent Laid-Open Nos. 2005-198249, 2005-175744, and 2005-175745 disclose a surround system by means of a wired bus-connected network system. As an example of the bus-connected network, USB, IEEE1394, and the like are known.

However, these methods pose the following new problems.

(1) Each SP requires a power supply. However, the power consumption of the surround system is around 100 W per CH, and such electrical power cannot be supplied via a USB (DC 5 V, 0.5 A) or IEEE1394 (DC 8 to 40 V, 1.5 A) connection cable. For this reason, each SP must individually receive a power supply. Then, as the prior art of network wiring using IEEE1394 (1394 wiring), the actual wiring state including power supplies becomes as shown in FIG. 21, resulting in troublesome power supply wiring. Referring to FIG. 21, reference numerals 2140 to 2145 denote power supply wiring lines to be newly added.

(2) The cable length must be limited to about 5 m, and the cable is relatively expensive since it adopts a multi-core structure.

(3) To support the transmission protocol, each device such as the SP must incorporate an advanced-function CPU, resulting in an expensive system.

(4) As the audio signal playback requirement for the surround system, playback time management is required. For example, in the case of IEEE1394, such management is achieved using time stamps included in its isochronous data packets. That is, each device holds synchronized clocks, and controls the output timing of playback data based on time stamp information included in incoming received data. Also, hardware for this purpose becomes relatively expensive.

(5) Since IEEE1394 or the like is a standard I/F, if it is used in the surround system, an unexpected device is likely to be connected, and an extra processing function must be equipped to cope with errors.

SUMMARY OF THE INVENTION

The present invention to provide a communication system which can achieve at least one of the following items:

1. Elimination of the need of individual AC power supply wiring lines and then simplification of the wiring;

2. Digital transmission without performance degradation;

3. Grasp and control for grasping the status of each speaker; and

4. Provision of a low-cost communication system which can configure a playback device such as a speaker (SP) without using any advanced-function CPU and time stamp-compatible hardware.

According to one aspect of the present invention, there is provided a communication system comprising a communication controller for transmitting an audio signal, and a plurality of communication adapters for playing back the audio signal by a playback device, the communication controller comprising an audio data modulation unit configured to modulate audio data by shifting, based on a first modulation ratio, a modulation carrier for modulating the audio data and a data transmission rate of the audio data in order to set a command transmission frequency bandwidth, and a command data modulation unit configured to modulate command data by shifting, based on a second modulation ratio, a modulation carrier for modulating the command data and a data transmission rate of the command data in the command transmission frequency bandwidth set by the audio data modulation unit.

According to another aspect of the present invention, there is provided a control method for a communication system which includes a communication controller for transmitting an audio signal, and a plurality of communication adapters for playing back the audio signal by a playback device, the method comprising:

a process executed in the communication controller, including a power supply voltage output step of turning on a power supply and outputting, to a communication adapter, only a power supply voltage supplied from the power supply, an audio modulated data output step of outputting audio modulated data to the communication adapter, and a command transmission step of transmitting a command to activate an amplifier of the communication adapter; and a process executed in the communication adapter, including an internal power supply driving step of turning on an internal power supply which drives parts except for a digital amplifier and amplifier power supply of the communication adapter in response to reception of the power supply voltage output in the power supply voltage output step, a digital amplifier clock generation step of generating a reference clock based on the audio modulated data output in the audio modulated data output step, and generating a digital amplifier clock for driving the digital amplifier based on the reference clock, an activation step of activating the digital amplifier and amplifier power supply in response to reception of the command output in the command transmission step, and a driving step of driving the digital amplifier using the digital amplifier clock generated in the digital amplifier clock generation step.

According to the present invention, it is possible to implement a communication system which can decrease the total number of wiring lines of speaker cables and power supply wiring lines, thus simplifying the wiring itself.

Furthermore, since transmission of an audio signal to each speaker is digitized, it is possible to provide a communication system without performance degradation due to long wiring lines.

It is also possible to implement a communication system in which two-way command transmission is achieved and the communication controller side can grasp the status of each speaker.

Since a communication adapter on the playback device side can be configured by a simple modulation/demodulation circuit or the like without using any advanced-function CPU and time stamp-compatible hardware, it is possible to provide a low-cost communication system.

Further features of the present invention will become apparent from the following description of exemplary embodiments with reference to the attached drawings.

BRIEF DESCRIPTION OF THE DRAWINGS

FIG. 1 is a block diagram showing the system configuration of a communication speaker system according to an embodiment of the present invention;

FIG. 5 is a diagram showing a connection method between an output terminal OUT1 of the communication controller and communication control SPs of Front L, Sub-Woofer, and Rear L;

FIGS. 6A and 6B are block diagrams showing the arrangement of the communication controller;

FIGS. 8A and 8B are block diagrams for explaining the arrangement of the communication adapter;

FIG. 9 is a block diagram showing the detailed arrangement of an audio clock playback circuit 816 in FIG. 8A and a command clock playback circuit 817 in FIG. 8B;

FIG. 11 is a view showing the frame structure of a command transmitted/received between the communication adapters and the communication controller via daisy wired connections;

FIG. 14 is a view showing the detailed contents of control information contained in an audio transmission frame;

FIG. 15 is a timing chart showing a modulation method used for the command frame (FIG. 11);

FIG. 18 is a sequence chart showing a control sequence between the communication controller 101 and each of the communication adapters 102 to 107 in activating corresponding digital amplifiers;

FIG. 21 is a block diagram showing the prior art of network wiring using IEEE1394.

DESCRIPTION OF THE EMBODIMENTS

Figure 2B:
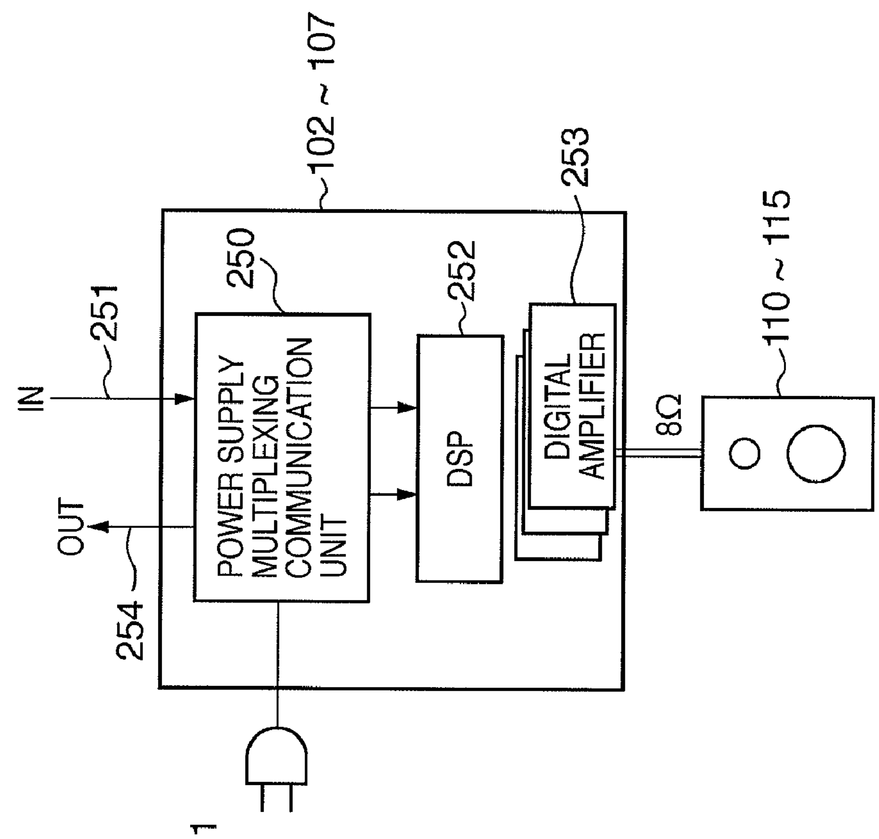
FIG. 2B is a schematic block diagram showing the internal arrangement of communication adapters 102 to 107.

Embodiments of the present invention will be illustrated in detail hereinafter with reference to the accompanying drawings. Note that components described in the embodiments are merely examples, and the technical scope of the present invention is defined by the appended claims but it is not limited by each individual embodiment to be described hereinafter.

FIG. 1 is a block diagram showing the system configuration of a communication speaker system according to an embodiment of the present invention. Referring to FIG. 1, reference numeral 101 denotes a communication controller serving as a signal source; and reference numerals 102 to 107, communication adapters respectively connected to speakers of respective audio CHs. The communication adapters 102 to 107 corresponding to a plurality of channels perform processing of playing back an audio signal transmitted from the communication controller 101. Reference numerals 110 to 115 denote, for example, commercially available Box speakers of 8Ω type. In the case of a 5.1CH surround system, these speakers 110 to 115 are respectively called a center SP, front L SP, front R SP, rear L SP, rear R SP, and LFE (or "subwoofer"). Communication control speakers corresponding to a plurality of channels are formed by combinations of the communication adapters and speakers. The communication adapters may be built in the speakers to have an integral structure, as a matter of course.

The communication system (communication speaker system) according to the embodiment of the present invention is a power supply signal multiplexing communication system which includes the communication controller 101 having a communication function and communication adapters in a number as large as the number of speakers, that is, the communication adapters 102 to 107.

In the communication system according to the embodiment of the present invention, there is proposed a wired connection communication method of multiplexing and transmitting signals and an AC power supply on duplex balanced daisy cables. Wiring lines 116 to 121 in FIG. 1 show a wiring example of the method.

The communication output terminals of the communication controller 101 shown in FIG. 1 are connected to the input terminal of the center SP communication adapter 102 and that of the front L SP communication adapter 103 via the predetermined duplex balanced daisy cables 116 and 117, respectively. The output terminal of the communication adapter 103 is connected to the input terminal of the subwoofer communication adapter 107 via the duplex balanced daisy cable (to also be referred to as "daisy cable" hereinafter) 118. The output terminal of the subwoofer communication adapter 107 is connected to the rear L SP communication adapter 105 via the duplex balanced daisy cable (to also be referred to as "daisy cable" hereinafter) 119.

Similarly, the output terminal of the communication adapter 102 and the input terminal of the communication adapter 104 are connected with each other via the duplex balanced daisy cable 120. The output terminal of the communication adapter 104 and the input terminal of the rear R SP communication adapter 106 are connected with each other via the duplex balanced daisy cable 121.

On each of those duplex balanced daisy cables, for example, 5.1CH audio signals and an AC power supply flow upon being multiplexed. The AC power supply flowing on the daisy cable is supplied from an external AC power supply terminal of the communication controller 101. The communication controller uses the AC power supply from the external AC power supply terminal after performing appropriate filtering processing to prevent communication signals such as PLC (Power Line Communication) from entering the daisy connection.

Figure 3A:
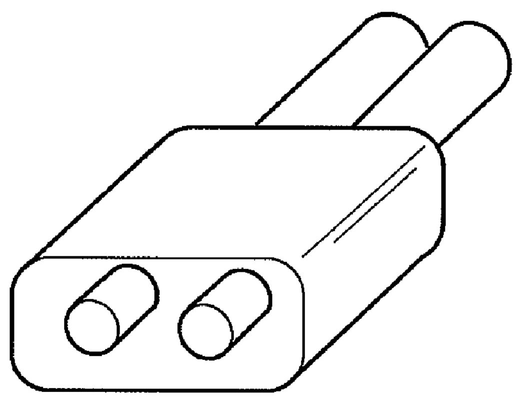
FIGS. 3A and 3B are views showing cable examples used in wired connections according to the embodiment of the present invention.
Figure 3B:
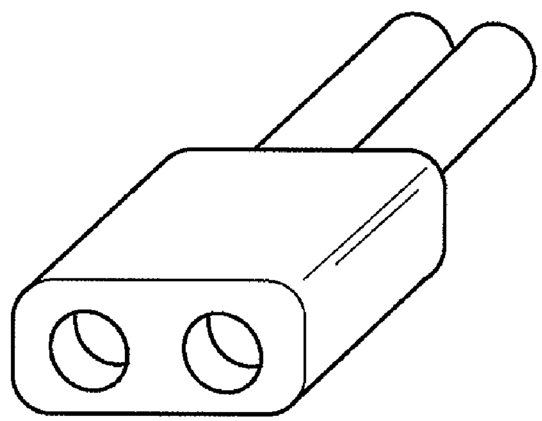

FIGS. 3A and 3B are views showing examples of a cable used in the wired connection according to the embodiment of the present invention. FIG. 3A shows the structure of the input side of the daisy cable, that is, an example of a plug which is connected to the duplex balanced cable and has male insertion pins. In correspondence with this plug, a female output receptacle (not shown) is equipped on the device (communication controller, communication adapter) side. The output receptacle includes a mechanical plug insertion detection switch (not shown) which is used in automatic detection.

FIG. 3B shows the structure of the output side of the daisy cable, that is, a plug which is connected to the duplex balanced cable and has female reception components. In correspondence with this plug, a male input receptacle (not shown) is equipped on the device (SP adapter) side. The input receptacle includes a mechanical plug insertion detection switch (not shown) which is used in automatic detection.

Figure 2A:
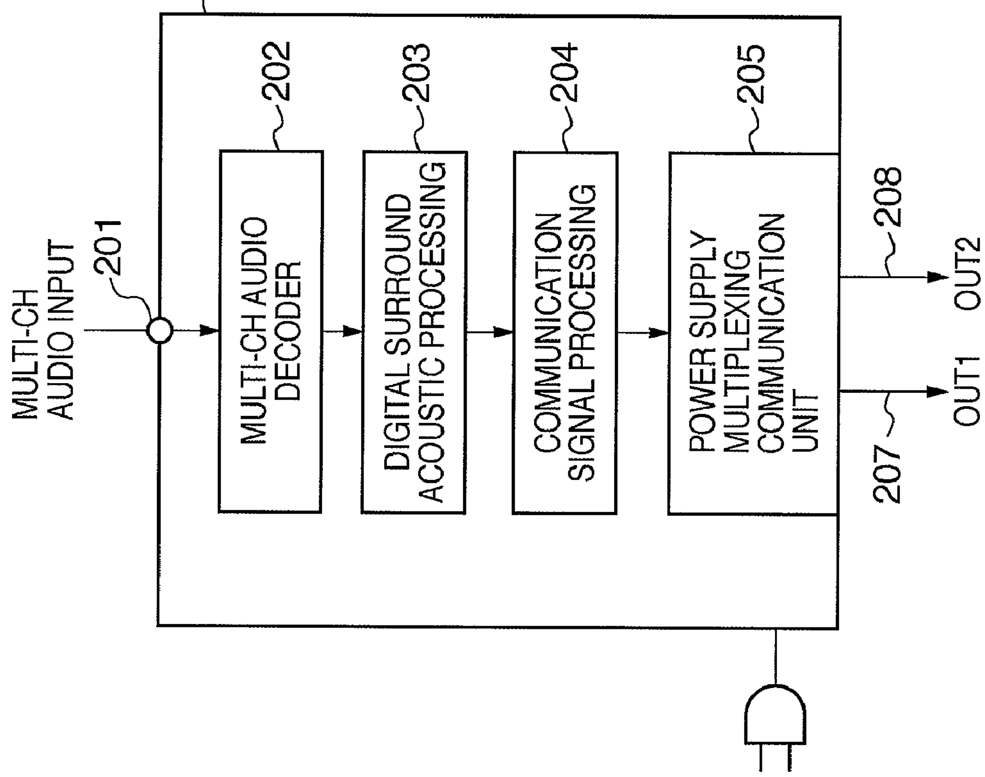
FIG. 2A is a schematic block diagram showing the internal arrangement of a communication controller 101 in FIG. 1.

FIGS. 2A and 2B are schematic block diagrams respectively showing the internal arrangements of the communication controller 101 and the communication adapters 102 to 107 in FIG. 1. FIG. 2A shows the arrangement of the communication controller 101, and FIG. 2B shows the arrangement of the communication adapters 102 to 107. Each communication adapter controls reception of data to be played back by a speaker, and playback by the speaker.

Referring to FIG. 2A, reference numeral 201 denotes a multi-CH audio signal input terminal, which is connected to, for example, an external DVD player (not shown) via an HDMI cable and receives a multi-CH audio signal encoded by, for example, Dolby Digital. Reference numeral 202 denotes a multi-CH audio decoder which decodes, for example, a Dolby Digital signal, and outputs six audio raw data for 5.1 CHs.

Reference numeral 203 denotes a digital surround processing circuit which performs frequency characteristic correction, delay time correction (time alignment), amplitude correction, and the like of audio signals to the respective SPs. The corrected 6CH audio data are sent to a communication signal processing unit 204, and undergo processing such as framing (to be described later). The communication audio signals which have undergone the processing are sent to a power supply multiplexing communication unit 205.

The power supply multiplexing communication unit 205 has output terminals OUT1 207 and OUT2 208 for two systems. This is to allow efficient wiring by providing two systems of outputs since the multi-speakers are generally allocated as R and L systems on the two sides to have the controller as the center.

Referring to FIG. 2B, reference numeral 250 denotes a power supply multiplexing communication unit, which has an input terminal IN 251 for one system and an output terminal OUT 254 for one system; reference numeral 252, a digital signal processor (DSP), which performs correction of various characteristics and the like depending on the physical characteristics of the SPs; and reference numeral 253, a D-class digital amplifier, which drives an external SP (or may be internal SP) at, for example, 8Ω. If a speaker to be used undergoes 3-way independent driving, three digital amplifiers are used.

The installation, role setting, and wiring of the communication speaker system of the present invention according to FIG. 1 are as follows.

First, the user sets the communication controller 101 of FIG. 2A at a desired position. Next, in the case of a 5.1CH surround system, the user sets the six communication control SP devices (each of which is formed by connecting the communication adapter and speaker, and is to also be referred to as "SP" hereinafter) shown in FIG. 2B at desired positions.

The communication control SP device for the subwoofer can be freely set at any location since its output acoustic frequency is low. However, other five communication control SP devices have predetermined recommended locations, which are designated by, for example, an installation manual. Note that the speakers except for the subwoofer with a relatively large size used for low-frequency playback use the same ones, and their roles are determined depending on their locations. After completion of the setting of these SPs, the user sets a role for each SP (communication adapter) using a mechanical setting switch (e.g., a rotary switch).

Note that the role indicates "center", "front L", "front R", "rear L", "rear R", "subwoofer", and the like. After the completion of setting the roles, the user sequentially wires from the communication controller to the communication adapters using the daisy cables.

In the case of FIG. 1, the user connects the input plug of the daisy cable 117 to the daisy OUT1 terminal of the communication controller 101, and the output plug on the opposite side to the daisy IN terminal of the front L communication adapter 103. Next, the user connects the input plug of the daisy cable 118 to the daisy OUT terminal of the front L communication adapter 103, and the output plug on the opposite side to the daisy IN terminal of the subwoofer communication adapter 107. Then, the user connects the input plug of the daisy cable 119 to the daisy OUT terminal of the subwoofer communication adapter 107, and the output plug on the opposite side to the daisy IN terminal of the rear L communication adapter 105. Likewise, the user connects the center communication adapter 102, front R communication adapter 104, and rear R communication adapter 106.

The operations of the input and output units of the communication controller and communication adapters in cable wiring connection will now be explained with reference to FIGS. 4A, 4B, and 5.

Figure 4A:
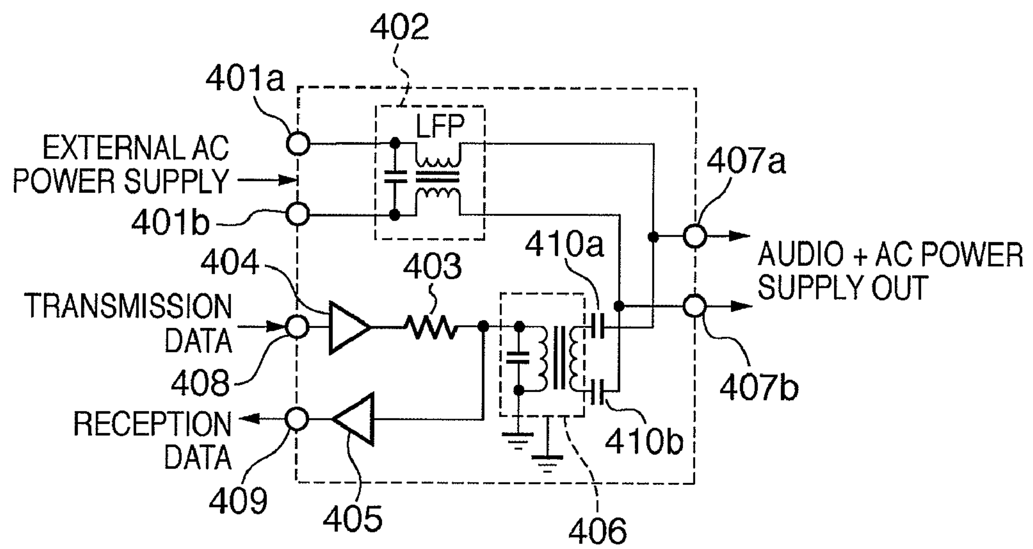
FIG. 4A is a diagram showing the arrangement of a power supply multiplexing transmission output unit on the communication controller side.

FIG. 4A is a diagram showing the arrangement of a power supply multiplexing communication unit on the communication controller side. Referring to FIG. 4A, reference numerals 401*a* and 401*b* denote external AC power supply input terminals which receive an input from an external AC power supply; reference numeral 402, a low-pass filter; reference numeral 403, a matching resistor; reference numerals 404 and 405, drive amplifiers; reference numerals 406, an RF transformer; reference numerals 407*a* and 407*b*, power supply signal multiplexing output terminals; reference numeral 408, a transmission modulated signal input terminal; and reference numeral 409, a reception modulated signal output terminal.

A power supply voltage from the external AC power supply is input to the low-pass filter 402 via the input terminals 401*a* and 401*b*. After the low-pass filter 402 removes undesired noise (including internal communication signals such as PLC) from the external power supply, the power supply voltage is output to the terminals 407*a* and 407*b* as AC power supply with low noise. On the other hand, a transmission modulated signal is supplied to the drive amplifier 404 via the transmission modulated signal input terminal 408, and then sent to the RF transformer 406 via the matching resistor 403. The output of the RF transformer 406 is sent on the power supply line of a noise filter output via coupling capacitors 410*a* and 410*b*, multiplexed with the power supply, and output to the terminals 407*a* and 407*b*.

Figure 4B:
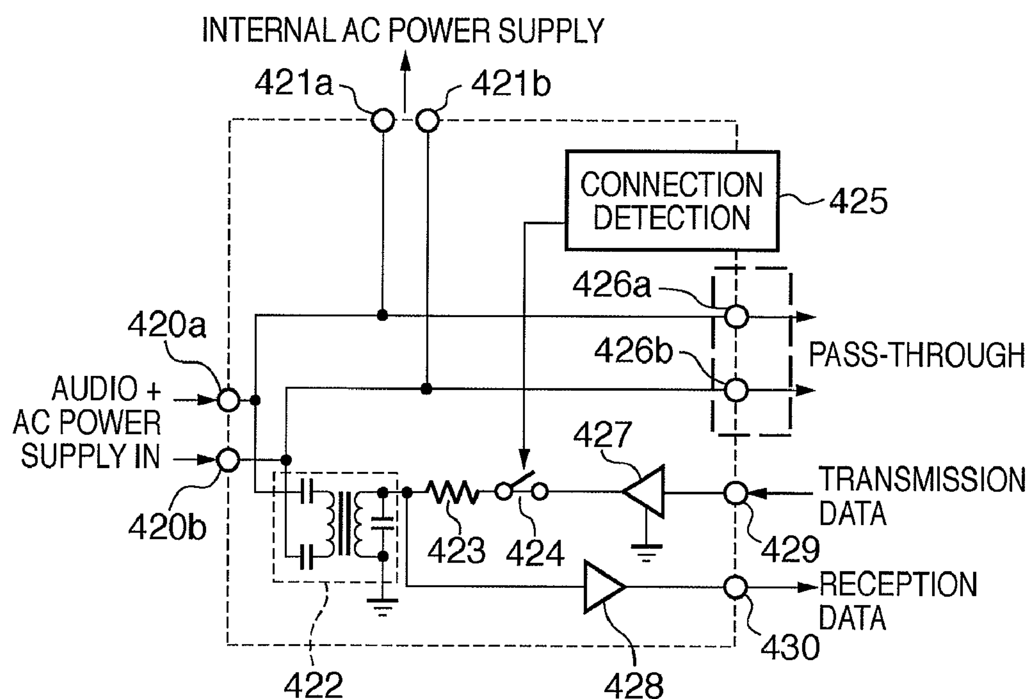
FIG. 4B is a diagram showing the arrangement of a power supply multiplexing communication unit on the communication control speaker (SP) side.

FIG. 4B is a diagram showing the arrangement of a power supply multiplexing communication unit on the communication control speaker (SP) side. Referring to FIG. 4B, reference numerals 420*a* and 420*b* denote reception power supply multiplexing audio signal input terminals (input units); reference numerals 421*a* and 421*b*, internal AC power supply output terminals; reference numeral 422, an RF transformer; reference numeral 423, a matching resistor; reference numeral 424, a switch for controlling the supply (ON/OFF) of an electric current to the matching resistor; and reference numeral 425, a mechanical cable connection detection circuit (connection detection unit).

Pass-through terminals 426*a* and 426*b* are output terminals to the subsequent communication adapter (communication control SP) (the pass-through terminals can function as output units). Reference numerals 427 and 428 denote drive amplifiers; reference numeral 429, a command modulated signal input terminal from the SP side; and reference numeral 430, a received audio signal output terminal. When the connectors of the connection cables from the succeeding stages are connected to the pass-through terminals 426*a* and 426*b*, the connection detection unit 425 mechanically detects it, and converts the detection result into an electric signal to control the switch 424. The switch 424 functions as an output control unit which controls outputs from the pass-through terminal 426*a* and 426*b* based on the detection result of the connection detection unit 425. The connection detection unit 425 detects an OFF state upon connection.

FIG. 5 is a diagram showing a connection method between the output terminal OUT1 of the communication controller and communication control SPs of the Front L, Sub-Woofer, and Rear L. Referring to FIG. 5, reference numeral 501 denotes a power supply multiplexing transmission unit of the communication controller, which includes the power supply multiplexing communication units for two systems (OUT1, OUT2) shown in FIG. 4A. Reference numeral 508 denotes an OUT1 terminal of the two systems.

Reference numeral 509 denotes a power supply multiplexing reception unit for the front L speaker, which uses the power supply multiplexing communication unit of FIG. 4B. Reference numerals 518 and 519 denote power supply multiplexing reception units for the Sub-Woofer and Rear L, respectively; and reference numerals 524, 525, and 526, daisy connection cables (to also be referred to as "cable" hereinafter) for transmitting a power supply multiplexed signal. The user connects the input end of the cable 524 to the OUT1 terminal 508 of the unit 501, and the output end to an input terminal 510 of the Front L. At this time, since the cable 525 is not connected to an output terminal (OUT terminal) 511 of the power supply multiplexing reception unit 509 for the front L speaker, a matching resistor ON/OFF switch 514 is turned on. When the user connects the input terminal of the cable 525 to the output terminal (OUT terminal) 511 of the power supply multiplexing reception unit 509 for the front L speaker, the switch is turned off as well as the matching resister.

When the user connects the output terminal of the cable 525 to the input terminal (IN terminal) of the unit 518 for the Sub-Woofer, since the OUT terminal is not connected via the daisy connection cable 526 at this time, the matching resister is turned on. When the user connects the input terminal of the daisy connection cable 526 to the OUT terminal of the unit 518 for the Sub-Woofer, the matching resister of the unit 518 for the Sub-Woofer is turned off. When the user finally connects the output terminal of the daisy connection cable 526 to the IN terminal of the unit 519 for the Rear L, a matching resistor 523 of the unit 519 for the Rear L is turned on.

As described above, the matching resisters of the Front L and Sub-Woofer of the intermediate stages are turned off, and the matching resister of the Rear L of the last stage is turned on. The final end of a wiring cable is matched so as to be suitable for transmission of an RF modulated signal. The resistance value of the matching resistor needs to match the characteristic impedance of the cable. The impedance matching allows communication adapters to simultaneously receive a transmission signal from the communication controller.

Similarly, the user connects the OUT2 terminal with the Center SP, Front R, and Rear R. Upon completion of all the connection operations, the user turns on the power supply of the communication controller. When the communication controller is powered on, an AC power supply is superposed on its daisy OUT terminals (OUT1, OUT2), and electric power is supplied in turn to the daisy-connected communication control SPs to also activate a syscon and a communication unit in each communication control SP. At this stage, a digital amplifier in each SP is in a stop state. It is not preferable to activate the digital amplifiers in all the connected SPs simultaneously with power-on of the communication controller because a rush current from the AC power supply accumulates to become too high. In this state, the syscon of each communication adapter reads and temporarily stores a predetermined role setting value (by the rotary switch).

After powering on, the communication controller needs to transmit audio data and instruct various controls to the communication adapters. A communication method according to the embodiment of the present invention to be used for the above operation will be described below.

Figure 10:
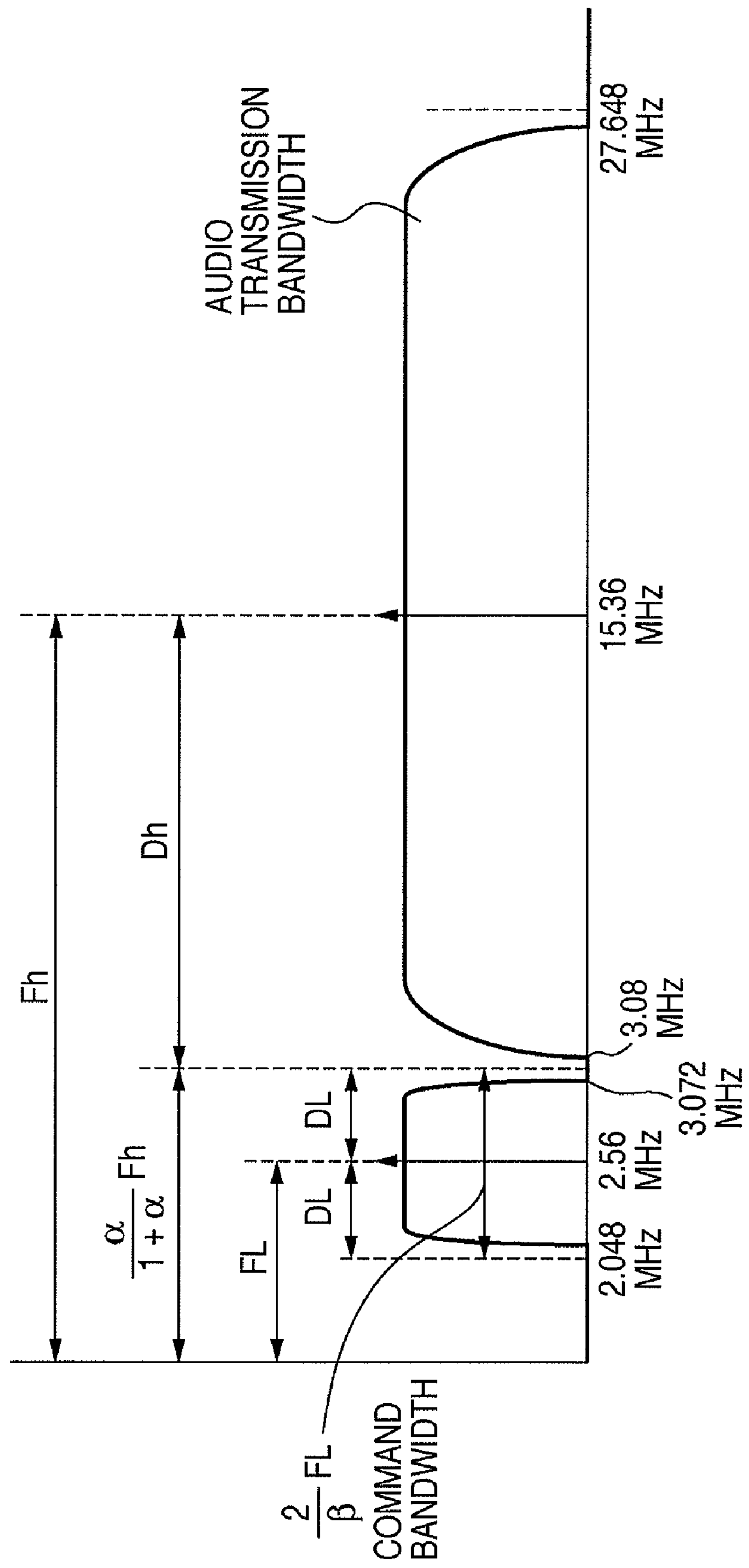
FIG. 10 is a view showing a band structure in a communication method.

FIG. 10 is a view showing a band structure (modulation band structure) in the communication method. An audio transmission bandwidth shown in FIG. 10 is, for example, 3 to 28 MHz, and is used to transmit audio data and control information from the communication controller. A bandwidth more than 28 MHz is inappropriate for data transmission via a duplex balanced daisy cable.

On the other hand, a 2- to 3-MHz bandwidth is used for command communication (command transmission) between the communication controller and the communication adapters. The use of a bandwidth of less than 2 MHz is avoided since the bandwidth may include harmonic noise from various switching power supply circuits and the like. Audio modulation methods and command modulation methods used in the bands will be described later.

Figure 13:
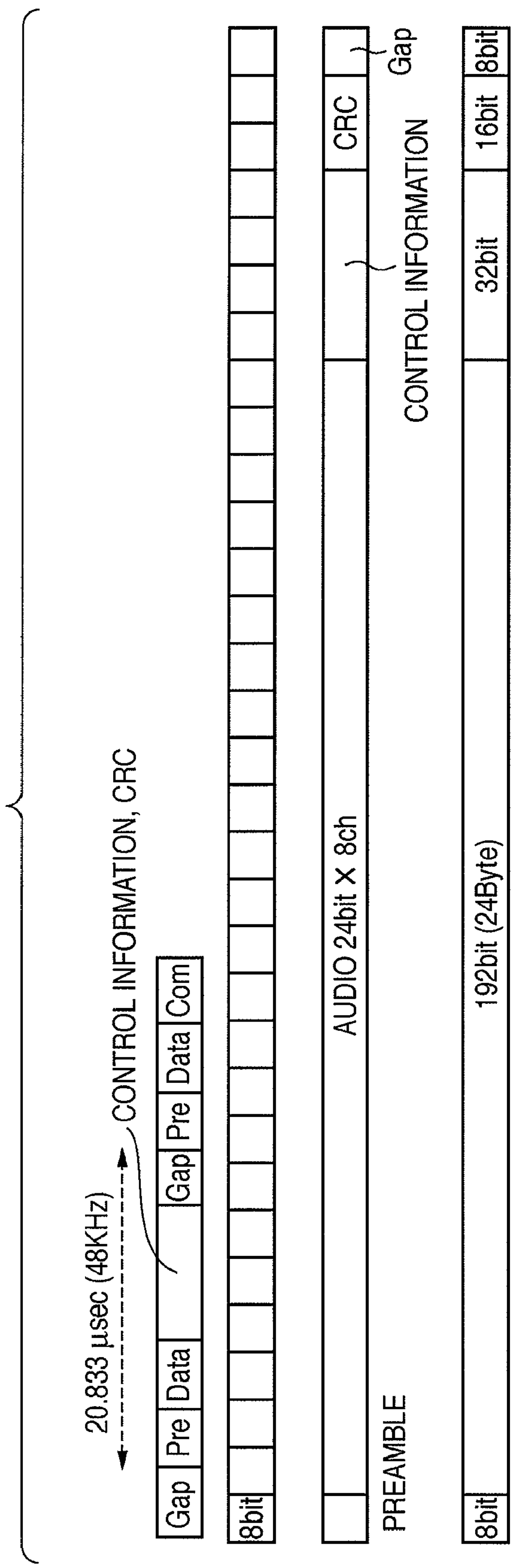
FIG. 13 is a view showing the frame structure of an audio transmission frame, containing control information and audio data, from the communication controller.

FIG. 13 is a view showing the frame structure of an audio transmission frame, containing control information and audio data, from the communication controller. This is used in the audio transmission bandwidth. The audio transmission frame is formed by fields including a preamble (8 bits), audio data (up to 192 bits=24 bits×8 CHs can be transmitted), control information (32 bits), CRC (16 bits) and Gap (8 bits). The cycle of the transmission frame containing the fields is set to, for example, 20.833 μsec in the case of a sampling rate of 48 kHz. The preamble indicates a clock signal for PLL clock synchronization. The CRC is used for the audio data and control information. The Gap is a non-modulation field for the timing of extracting a preamble field.

FIG. 14 is a view showing the detailed contents of the control information contained in the audio transmission frame. The control information is formed by command arbitration information (8 bits), a control type (8 bits), a control header (8 bits), and a control code (8 bits).

The command arbitration information has 8 bits to specify a command flow direction, in which the first 4 bits indicate “From” and the last 4 bits indicate “To”. There exist two types of command flow, that is, “1 to 1” and “1 to all”. If, for example, “From” is Hex0, the controller serves as a command transmission source. If “To” is Hex0, all the communication adapters are transmission destinations. In this case, a broadcast command from the controller is specified. If “To” is one of Hex1 to HexF, one-to-one communication from the controller to a predetermined communication adapter is specified. As for a response from a communication adapter to the controller, “From” is one of Hex1 to HexF and “To” is Hex0. The communication controller can ensure an appropriate communication frequency with the communication adapters by manipulating the command arbitration information in accordance with the circumstances. This command arbitration information allows command communication without collision between the communication controller and the communication adapters.

The control type field is used to specify the type of control content, which is selected from, for example, remote control, status information, and setting data. The control header field is used to set the length and order of the subsequent control code. This makes it possible to obtain a long control code by combining a plurality of control codes. This mode is convenient for transmitting long setting data. The control code field is used to set an actual control content such as a remote control code, a status, and setting data.

Figure 16:
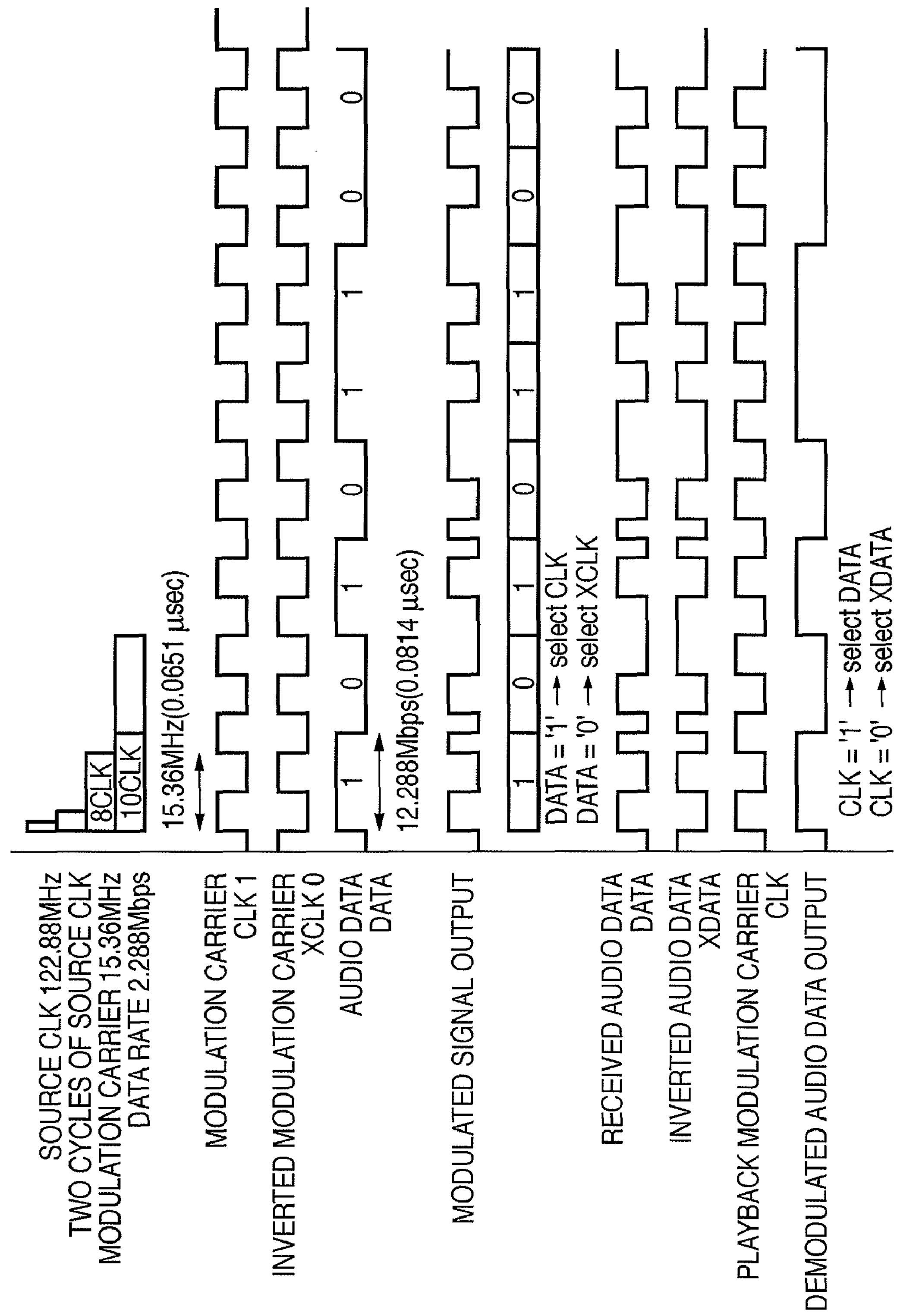
FIG. 16 is a timing chart showing a modulation method used for the audio transmission frame.

FIG. 16 is a timing chart showing a modulation method used for the audio transmission frame. The modulation method in the present invention needs to meet the following requirements 1 to 4.

1. Because transmission is performed via a duplex balanced cable, the transmission bandwidth is equal to or less than 28 MHz.

2. A bandwidth equal to or less than 3 MHz is reserved as a command bandwidth.

3. Synchronous transmission of audio sampling data is attained.

4. Modulation/demodulation can be attained at low cost.

A modified Manchester method shown in FIG. 16 meets above requirements 1 to 4. Referring to FIG. 16, the modulation carrier is 15.36 MHz which is 1/8 of a 122.88-MHz source clock. The data rate of the audio data is 12.288 Mbps which is 1/10 of the 122.88-MHz source clock.

The modulation method generates the inverted signal of the modulation carrier, and switches (selects) between a modulation carrier clock (modulation carrier) and an inverted modulation carrier clock (inverted modulation carrier) in accordance with “1” and “0” of the audio data.

Figure 17A:
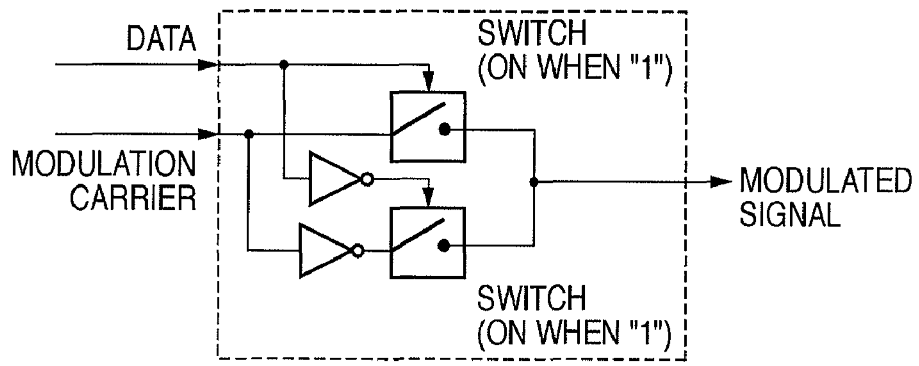
FIG. 17A is a block diagram showing an example of a modulation circuit.

FIG. 17A is a diagram showing a modulation circuit, which is formed by an inverter and selector. FIG. 16 shows modulation timings when the audio data contains “10101100”. Note that “1” indicates high data contained in the modulated audio data and “0” represents low data contained in the modulated audio data. As for demodulation, a preamble is extracted from the received signal, and a modulation clock is played back from the preamble using the PLL. Since the preamble field corresponds to 8 bits of data or 10 cycles of the modulation carrier, the modulation clock is adequately played back.

Figure 17B:
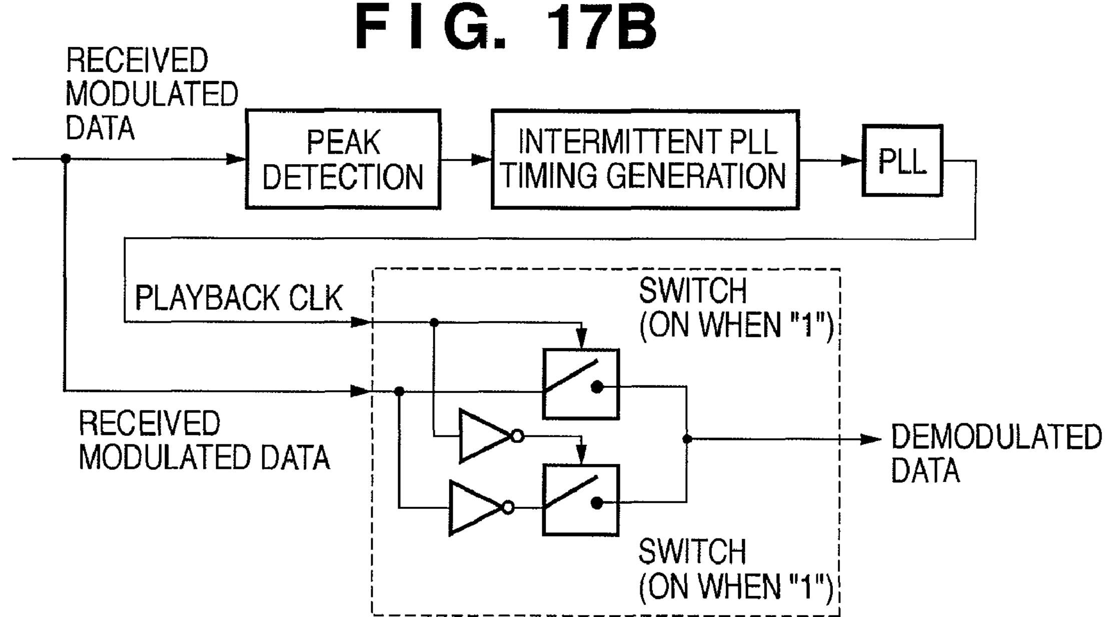
FIG. 17B is a block diagram showing an example of a demodulation circuit.
Figure 17C:
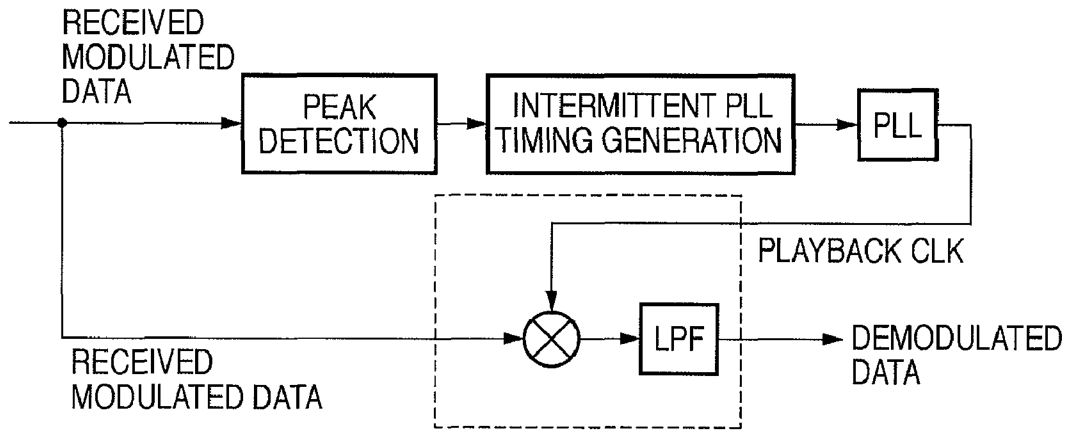
FIG. 17C is a block diagram showing an example of a demodulation circuit using a multiplier.

It is possible to acquire a demodulated audio data output by switching between the received audio data and its inverted signal by a playback modulation carrier. FIG. 17B is a diagram showing a demodulation circuit, which is formed by a modulation carrier playback circuit, an inverter, and a selector. It is also possible to realize similar demodulation by inverting the received audio data with “1” and “0” of the playback carrier. In this case, a multiplier is used. FIG. 17C is a diagram showing a demodulation circuit using a multiplier, which is formed by a modulation carrier playback circuit, a multiplier, and an LPF (Low Pass Filter). The LPF is effective in removing noise.

In the modified Manchester modulation method, the above-mentioned requirements 1 and 2 are met by shifting the data transmission rate (Dh) (12.288 MHz) and modulation carrier (Fh) (15.36 MHz) by a modulation ratio (first modulation ratio) $\alpha$=0.25.

The modulation ratio $\alpha$ is used to represent the ratio between the modulation carrier (Fh) and the data transmission rate (Dh) as 1+$\alpha$:1. In this case, as shown in FIG. 10, $\alpha$Fh/(1+$\alpha$) indicates a predetermined low-pass bandwidth (low-pass frequency bandwidth) to be set for command communication.

Since the preamble field synchronizes with an audio sampling frequency of 48 KHz, requirement 3 is satisfied.

As for requirement 4, modulation/demodulation is implemented by a modulation circuit including an inverter and selector, and a demodulation circuit including a modulation carrier playback circuit, inverter, and selector or a simple demodulation circuit including a modulation carrier playback circuit, multiplier, and LPF. This makes it possible to attain modulation/demodulation at extremely low cost.

FIG. 11 is a view showing the frame structure of a command transmitted/received between the communication adapters and the communication controller via daisy wired connections. The command frame is formed by fields including a preamble (16 bits), command data (40 bits), CRC (8 bits) and Gap (21 bits+80 CLK (source clock:reference clock)). The cycle of the command frame containing the fields is set to, for example, 6 KHz, 166.667 μsec. That is, the command frame has a length corresponding to eight cycles of the audio transmission frame.

The preamble indicates a clock signal for PLL clock synchronization. The CRC is used for the command data. The Gap is a non-modulation field for the timing of extracting a preamble field.

Figure 12:
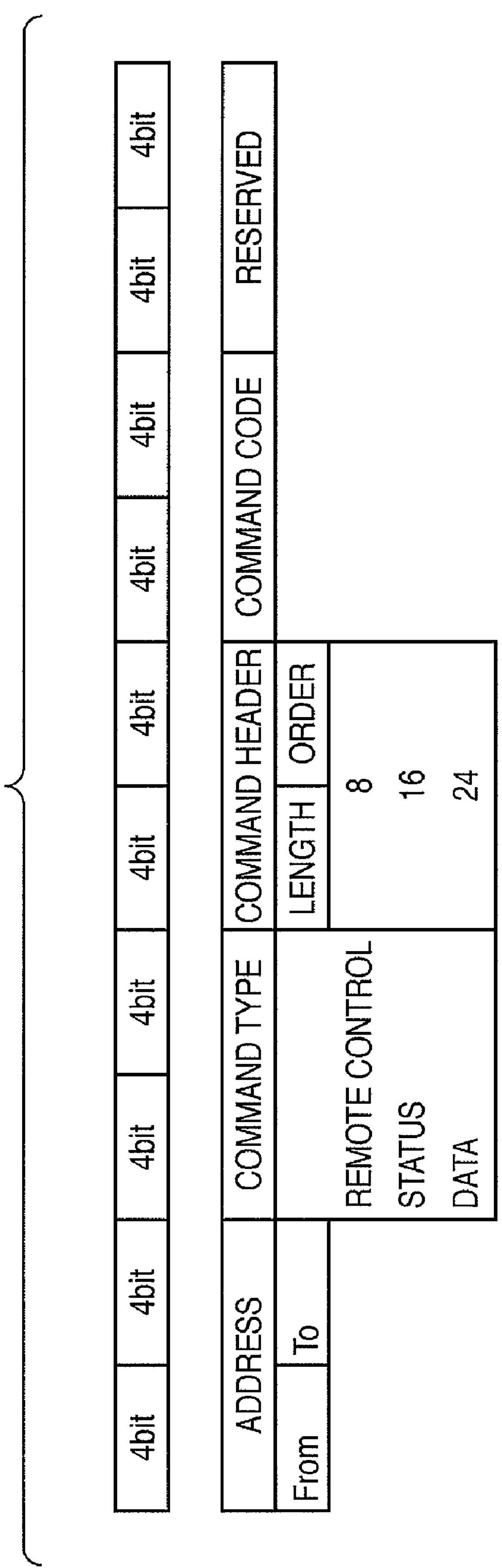
FIG. 12 is a view showing the contents of command data.

FIG. 12 is a view showing the contents of the command data. The command data is formed by fields including an address (8 bits), a command type (8 bits), a command header (8 bits), a command code (8 bits), and a reserved field (8 bits).

The address has 8 bits to define a command transmission source and destination, in which the first 4 bits indicate "From" and the last 4 bits indicate "To". The contents of the address field match the command arbitration information of the control information (FIG. 14) of the audio transmission frame. That is, the communication controller transmits a command in accordance with the command arbitration information of the received audio frame from the communication controller serving as a host device. This makes it possible to share a single command band between a plurality of communication adapters without collision.

The command type field of the command data is used to specify the type of control content, which is selected from, for example, remote control, status information, and setting data. The command header field is used to set the length and order of the subsequent command code. This makes it possible to obtain a long command by combining a plurality of command codes. This mode is convenient for transmitting a long command.

The command code field is used to set an actual control content such as a remote control code, a status, and setting data. The reserved field is an auxiliary data field.

FIG. 15 is a timing chart showing a modulation method used for the command frame (FIG. 11). The modulation method in the embodiment of the present invention needs to meet following requirements 1 to 3.

1. A 2- to 3-MHz band is used as a command band.

2. Synchronization with the audio transmission frame is achieved.

3. Modulation/demodulation is attained at low cost.

A modified Manchester method in FIG. 15 meets the above-mentioned requirements 1 to 3. Referring to FIG. 15, the modulation carrier is 2.56 MHz, which is 1/48 of the 122.88-MHz source clock. The data rate of the command data is 0.512 Mbps, which is 1/240 of the 122.88-MHz source clock.

The modulation method generates the inverted signal of the modulation carrier, and switches (selects) between the modulation carrier and the inverted modulation carrier in accordance with "1" and "0" of the command data. Referring to FIG. 15, the command data contains "101100", and the inverted signal of the modulation carrier corresponding to the command data is generated by, for example, the modulation circuit shown in FIG. 17A. Note that "1" contained in the modulated command data indicates high data and "0" represents low data.

As for demodulation, a preamble is extracted from the received signal, and a modulation clock is played back from the preamble using the PLL. Since the preamble field corresponds to 16 bits of data or 80 cycles of the modulation carrier, the modulation clock is adequately played back. It is possible to acquire a demodulated output by switching between the received command data and its inverted signal by a playback modulation carrier. FIG. 17B is a diagram showing the demodulation circuit. A playback clock (CLK) is generated by a peak detection circuit, an intermittent PLL timing generation circuit and a PLL circuit based on the received modulated data. The playback clock (CLK) and received modulated data are input to the modulation carrier playback circuit. The modulation carrier playback circuit has an inverter and selector, and outputs demodulated data. It is also possible to attain similar demodulation by inverting the received command data with "1" and "0" of the playback carrier. In this case, a multiplier is used.

FIG. 17C is a diagram showing the demodulation circuit using a multiplier. The demodulation circuit is formed by a modulation carrier playback circuit, a multiplier, and an LPF (Low Pass Filter). The LPF is effective in removing noise.

In command modulation/demodulation, the clocks used in the audio transmission frame modulation/demodulation are used to secondarily generate necessary clocks, thereby omitting the command modulation carrier playback circuit. In the modified Manchester modulation method according to the embodiment, requirement 1 is met by shifting the data rate (0.512 Mbps) and modulation carrier (2.56 MHz) by the second modulation ratio $\beta$=5.

The second modulation ratio $\beta$ is used to represent the ratio between the modulation carrier (FL) and the data transmission rate (DL) as $\beta$:1. In this case, as shown in FIG. 10, 2FL/$\beta$ indicates a predetermined low-pass bandwidth to be reserved. Note that an original Manchester modulation method uses $\beta$=2.

Since the preamble field synchronizes with 1/8 of the audio sampling frequency of 48 KHz, requirement 2 is satisfied. As for requirement 3, modulation/demodulation can be implemented by a modulation circuit with a simple arrangement including an inverter and selector, and a demodulation circuit with a simple arrangement including a modulation carrier playback circuit, inverter, and selector or a simple demodulation circuit including a modulation carrier playback circuit, multiplier, and LPF, resulting in extremely low cost.

The operation of the system will be explained next. FIGS. 6A, 6B, 8A and 8B are block diagrams showing the details of the system according to the embodiment of the present invention. FIGS. 6A and 6B are block diagrams showing the arrangement of the communication controller 101 (FIGS. 1 and 2) serving as a source device, that is, a host device. FIGS.

8A and 8B are block diagrams for explaining the arrangement of the communication adapters 102 to 107 (FIGS. 1 and 2) serving as client devices.

Referring to FIG. 6B, a multi-CH audio input terminal 601 is connected to, for example, an external DVD player, to which multi-CH audio data is input. A multi-CH audio decoder 602 decodes compressed multi-CH audio data, and separates 6CH individual audio PCM signals from, for example, 5.1CH compressed audio data to output them. The 6CH individual audio signals are sent to a digital surround acoustic processing circuit 603 to undergo frequency characteristic correction, delay time correction (time alignment), amplitude correction, and the like.

The multi-CH audio input terminal 601, multi-CH audio decoder 602, and digital surround acoustic processing circuit 603 correspond to reference numerals 201, 202, and 203 in FIG. 2A, respectively.

The audio data which has undergone predetermined correction processing is sent, in a predetermined format, to an audio transmission frame generation circuit 604 where the audio transmission frame shown in FIG. 13 is formed. A syscon 606 sets and controls the control information of the audio transmission frame.

A clock generation unit 605 generates various timings necessary for the processing by the audio transmission frame generation circuit 604. The clock generation unit 605 generates all necessary clocks based on an external audio clock (a clock associated with the sampling frequency of an external multi-CH audio input) acquired via the digital surround acoustic processing circuit 603. The output of the audio transmission frame generation circuit 604 is sent to an audio modulation circuit 609 (audio data modulation unit), which modulates the output into an audio modified Manchester code shown in FIG. 16. The detailed arrangement of the modulation circuit is shown in FIG. 17A. The audio modulated signal undergoes band-pass processing at a BPF 612, and is sent to an adder 614.

A command frame generation circuit 607 generates a command frame shown in FIG. 11. The syscon 606 sets and controls the fields of the command frame. The clock generation unit 605 generates various timings of processing necessary for generating the command frame.

The output of the command frame generation circuit 607 is sent to a command modulation circuit 610 (command data modulation unit), which modulates the output into a command modified Manchester code shown in FIG. 15. The detailed circuit arrangement is shown in FIG. 17A. The command modulated signal undergoes band-pass processing at a BPF 613, and is sent to the adder 614. The adder 614 adds the audio modulated signal and command modulated signal to obtain a sum signal.

The output (sum signal) of the adder 614 is sent to cable drive power amplifiers (PAs) 626 and 627, which amplify the sum signal to a sufficient voltage level, and send it to multiplexing/demultiplexing circuits 624 and 625, respectively.

The received commands from the communication controller 101, which are output from the multiplexing/demultiplexing circuits 624 and 625, are sent to an adder 615 via command bandwidth separation BPFs 616 and 617, respectively. The received commands from the adder 615 are input to a command demodulation circuit 611, which demodulates the input received commands. The detailed circuit arrangement is shown in, for example, FIG. 17C. Note that the reception command modulation carrier playback PLL circuit of the command demodulation circuit 611 can be omitted since the received command modulation carrier and the transmitted command modulation carrier are virtually synchronous with each other. In this case, the 2.56-MHz modulation carrier is supplied from the command frame generation circuit 607. The demodulated command data from the command demodulation circuit 611 is sent to a command buffer 608, which transmits the demodulated command data to the syscon 606.

As for the AC power supply system, an external AC power supply plug 618 is connected to an indoor AC power supply outlet. A noise removal filter 619 removes noise from the external AC power supply plug 618, thereby attenuating noise within a predetermined bandwidth so as not to adversely affect subsequent transmission signal multiplexing. If the indoor AC power supply line includes a packet transmission signal such as PLC, it is particularly important to remove it. A DC power supply circuit 620 generates a DC power supply for internal use. The AC power supply after noise removal is sent to a relay 622 via a noise removal low-pass filter (LPF) 621. The purpose of the second noise removal is to remove electromagnetic noise of internal circuits picked up by parallel cable wiring of the intermediate route immediately before multiplexing/demultiplexing. An overcurrent detection circuit 623 is arranged on the output side of the relay 622. If a short circuit occurs in a connection cable or the like, the relay immediately interrupts the power supply output to avoid any danger. The AC power supply output of the overcurrent detection circuit 623 is sent to the multiplexing/demultiplexing circuits 624 and 625.

With the multiplexing operation of the multiplexing/demultiplexing circuit 624, the transmission signals from the power amplifiers 626 and 627 are multiplexed with power supply voltages, and sent to daisy output terminals 630 and 631, respectively. The received command signals from the daisy output terminals 630 and 631 are sent to the command demodulation circuit 611 via command bandwidth separation BPFs 616 and 617 and the adder 615.

Figure 7:
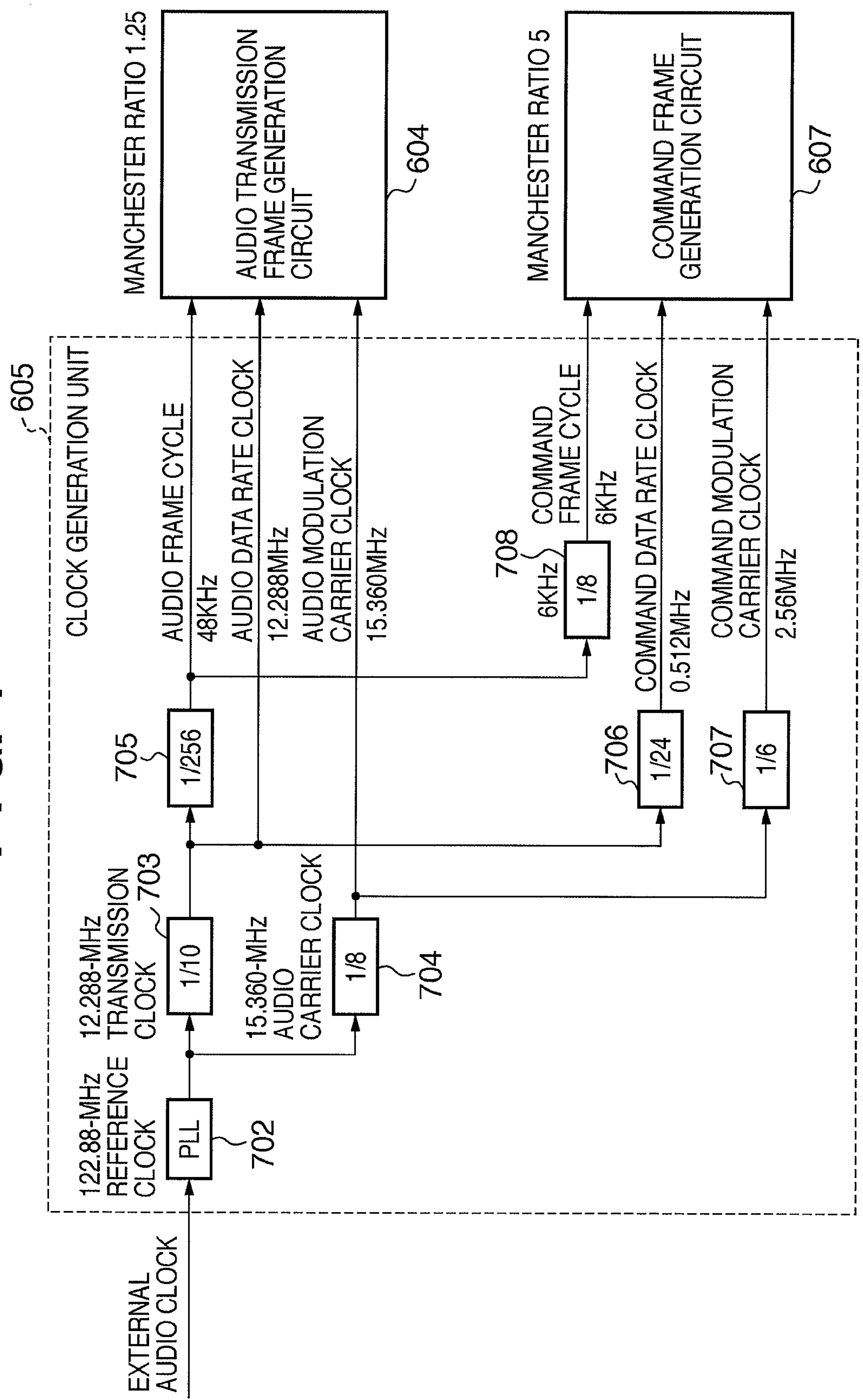
FIG. 7 is a block diagram showing in detail the function of a clock generation unit 605 in FIG. 6B.

FIG. 7 is a block diagram showing in detail the function of the clock generation unit 605 in FIG. 6B. An external audio clock shown in FIG. 7 has a sampling frequency of 48 KHz. A PLL circuit 702 generates a 122.88-MHz reference clock (source clock) based on the external audio clock. A 1/10 frequency divider 703 frequency-divides the source clock to obtain a 12.288-MHz clock ("1/10" indicates a frequency dividing ratio), which corresponds to an audio data rate.

A 1/256 frequency divider 705 ("1/256" indicates a frequency dividing ratio) frequency-divides the resultant clock to obtain a 48-KHz clock, which corresponds to an audio frame cycle. A 1/8 frequency divider 704 ("1/8" indicates a frequency dividing ratio (first frequency dividing ratio)) frequency-divides the source clock to obtain a 15.36-MHz clock, which corresponds to an audio modulation carrier. As for the command frame, a 1/8 frequency divider 708 ("1/8" indicates a frequency dividing ratio) frequency-divides the output of the 1/256 frequency divider 705 to obtain a 6-KHz clock, which corresponds to a command frame cycle.

A 1/24 frequency divider 706 ("1/24" indicates a frequency dividing ratio) frequency-divides the output of the 1/10 frequency divider 703 to obtain a 0.512-MHz clock, which corresponds to a command data rate. A 1/6 frequency divider 707 ("1/6" indicates a frequency dividing ratio) frequency-divides the output of the 1/8 frequency divider 704 to obtain a 2.56-MHz clock, which corresponds to a command modulation carrier clock. A frequency dividing ratio "1/48" (second frequency dividing ratio) obtained by multiplying the frequency dividing ratio of the 1/8 frequency divider 704 with that of the 1/6 frequency divider 707 is used to generate a command modulation carrier clock based on the reference clock (122.88 MHz). On the basis of the thus obtained timing clock, an audio transmission frame and a command frame are formed.

Figure 8B:
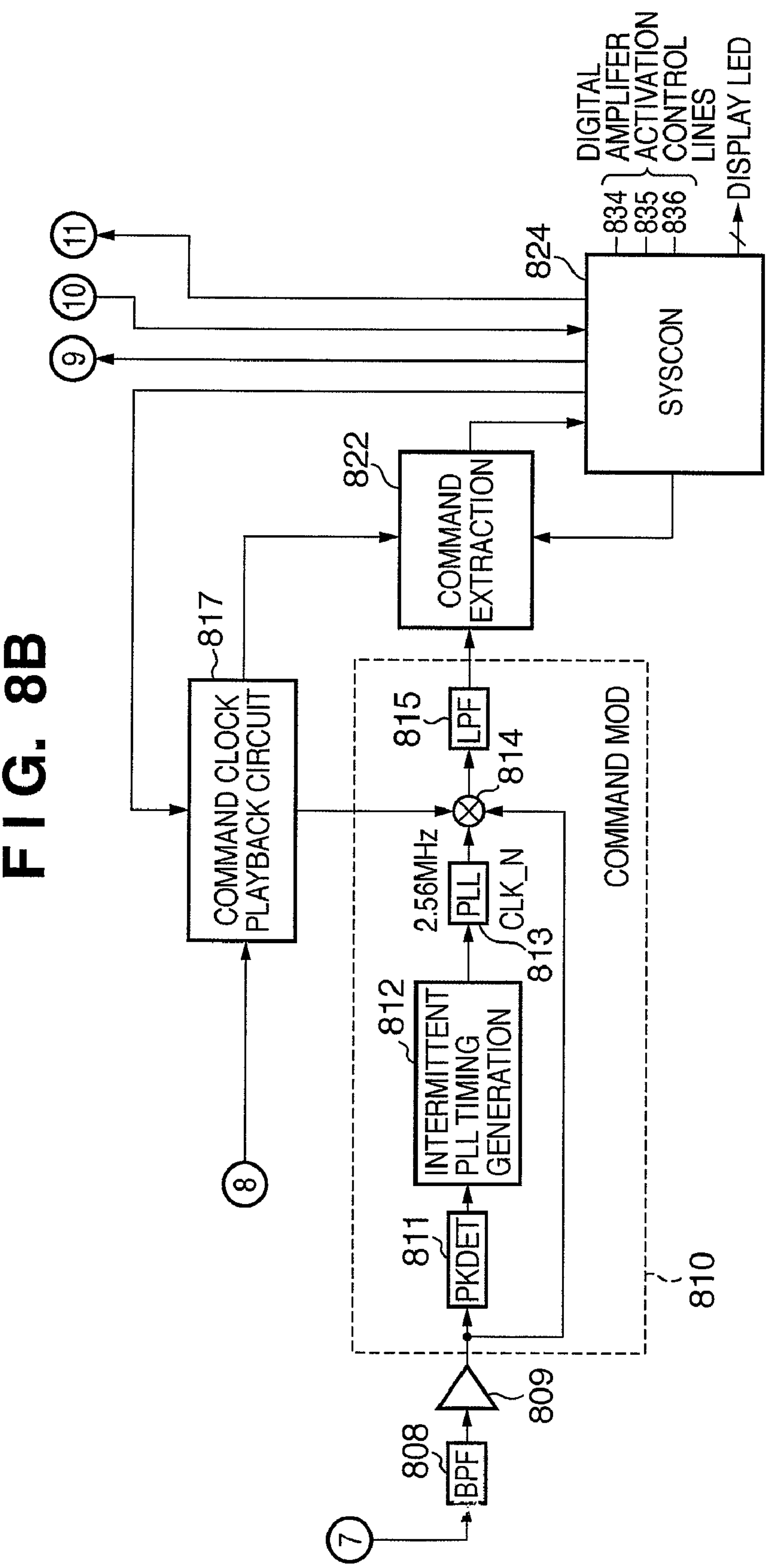

The communication adapter will be explained next. FIGS. 8A and 8B are block diagrams showing the arrangement of the communication adapters 102 to 107 (FIGS. 1 and 2) serving as client devices.

Referring to FIG. 8A, daisy wired input terminals 801 transmit received power supply multiplexing transmission signals to a multiplexing/demultiplexing circuit 803. The detailed arrangement of the multiplexing/demultiplexing circuit 803 is shown in FIG. 4B. An AC power supply and received signal are extracted from the input power supply multiplexing signals (audio+AC power supply). For example, the pass-through terminals 426*a* and 426*b* shown in FIG. 4B (which correspond to pass-through output terminals 802 in FIG. 8A) are arranged in the multiplexing/demultiplexing circuit 803, and serve as a daisy output to the subsequent communication adapter. The switch 424 controls the supply (ON/OFF) of an electric current to the matching resistor 423 in accordance with the presence/absence of insertion of a daisy connection cable to the subsequent communication adapter.

The received data from the communication controller 101, which have been separated by the multiplexing/demultiplexing circuit 803, are sent to a low-noise amplifier (LNA) 806, and then to an audio transmission bandwidth separation BPF 807 and command bandwidth separation BPF 808 after undergoing predetermined amplification processing.

A modulated audio transmission frame acquired in the audio transmission bandwidth separation BPF 807 is sent to an audio demodulator 850 via an RF amplifier 809. In the audio demodulator 850, a reception audio modulation carrier playback PLL circuit denoted by reference numerals 860, 870, and 880 plays back and demodulates the 15.36-MHz audio modulation carrier from the received modulated audio transmission frame signal. The received audio transmission frame which has been demodulated by the audio demodulator 850 has the frame structure in FIG. 13. The received audio transmission frame is sent to an audio self CH signal extraction/self CH control information extraction circuit 820 (to also be referred to as "extraction circuit 820" hereinafter) via a multiplier 881 and LPF 890.

A syscon 824 sets a role code in the extraction circuit 820 in advance. The extraction circuit 820 extracts audio CH data corresponding to the role code, and sends it to a DSP circuit 823. The extraction circuit 820 also transmits extracted control information to the syscon 824.

The DSP circuit 823 separates the audio signals into 3-way range bands after performing predetermined processing such as correction of the speaker (SP) frequency characteristics. The DSP circuit 823 then transmits the audio signals in the ranges to digital amplifiers 825, 826, and 827, respectively. The audio signals undergo amplification to a predetermined power level at the digital amplifiers 825, 826, and 827, and are supplied to audio speaker drivers 828, 829, and 830, respectively, thereby playing back the acoustic signals.

If a digital amplifier clock synchronizes with a transmission clock, beat noise due to interference between the clocks does not occur. By operating the digital amplifiers 825, 826, and 827 using secondary clocks generated based on the various clocks which are played back by the audio clock playback circuit 816 from the reception audio modulation carrier, advantages in performance and control are provided.

It is possible to indirectly control ON/OFF of the digital amplifier clocks by controlling ON/OFF of the audio modulation outputs by the communication controller 101. That is, it is possible to simultaneously transit all the digital amplifiers of all the connected communication adapters to a standby mode by turning off the audio modulation outputs.

On the other hand, since in activating the digital amplifiers, rush currents from the power supply capacitors of the digital amplifiers/amplifier power supplies accumulate to become huge, it is necessary to prevent deterioration in each contact of the AC power supply wiring. To do this, it is necessary to activate the digital amplifiers (cancel the standby mode) in turn using a command. This can be accomplished by performing command communication between the communication controller 101 and the communication adapters 102 to 107.

Each element 831, 832, or 833 in FIG. 8A is configured by an AND logic circuit, and functions as an execution unit associated with activation of the digital amplifier/amplifier power supply and transition to a standby mode. The syscon 824 controls the operation of the audio clock playback circuit 816. The output of the audio clock playback circuit 816 is input to the gates of the AND logic circuits (elements 831, 832, and 833). The operations of the digital amplifiers 825, 826, and 827 are controlled based on the outputs from the elements 831, 832, and 833, respectively.

When the communication controller 101 turns off the audio modulation output, the digital amplifier clock of the audio clock playback circuit 816 of each of the communication adapters 102 to 107 is turned off. The digital amplifier clocks to the elements 831 to 833 disappear (are turned off), and the operation clocks of the digital amplifiers 825, 826, and 827 disappear (are turned off). Consequently, the digital amplifiers 825, 826 and 827 of each of the communication adapters 102 to 107 transit to a standby mode.

As for activation of the digital amplifiers, when the communication controller 101 turns on the audio modulation output, the digital amplifier clock from the audio clock playback circuit 816 of the communication adapter is output to the elements 831 to 833. After that, the syscon 824 controls digital amplifier activation control lines 834, 835, and 836 in accordance with an activation command from the communication controller 101 to turn on supply of the operation clock to the digital amplifier clock. With this operation, the digital amplifiers 825, 826, and 827 are sequentially turned on.

FIG. 18 is a sequence chart for explaining a control sequence between the communication controller 101 and each of the communication adapters 102 to 107 in activating the corresponding digital amplifiers.

In step S1801, the communication controller 101 turns on its power supply, and only outputs a power supply voltage supplied from the power supply to a corresponding communication adapter (a power supply voltage output step).

In step S1802, the communication adapter receives the power supply from the communication controller, and turns on an internal power supply which only drives predetermined parts except for the digital amplifiers and amplifier power supplies of the communication adapter (an internal power supply driving step).

In step S1803, the communication controller 101 outputs audio modulated data to the communication adapter (an audio modulated data output step). In step S1804, the corresponding one of the communication adapters 102 to 107 generates a reference clock based on the audio modulated data output from the communication controller. The corresponding one of the communication adapters 102 to 107 then generates, based on the reference clock, digital amplifier clocks for driving the digital amplifiers (a digital amplifier clock generation step).

In step S1805, the communication controller 101 transmits a command to activate the digital amplifiers 825, 826, and 827 to the communication adapter (a command transmission step).

In step S1806, the syscon 824 of the corresponding one of the communication adapters 102 to 107 activates the digital amplifiers and amplifier power supplies in response to the command transmitted from the communication controller 101 (an activation step).

In step S1807, the syscon 824 of the corresponding one of the communication adapters 102 to 107 drives the digital amplifiers using the digital amplifier clock generated in preceding step S1804 (a driving step).

Figure 19:
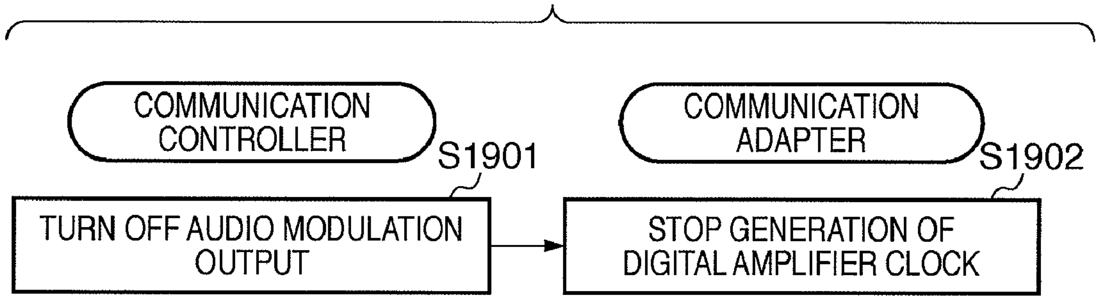
FIG. 19 is a sequence chart for explaining a control sequence between the communication controller and the communication adapter in transiting the digital amplifiers to a standby mode.
Figure 20:
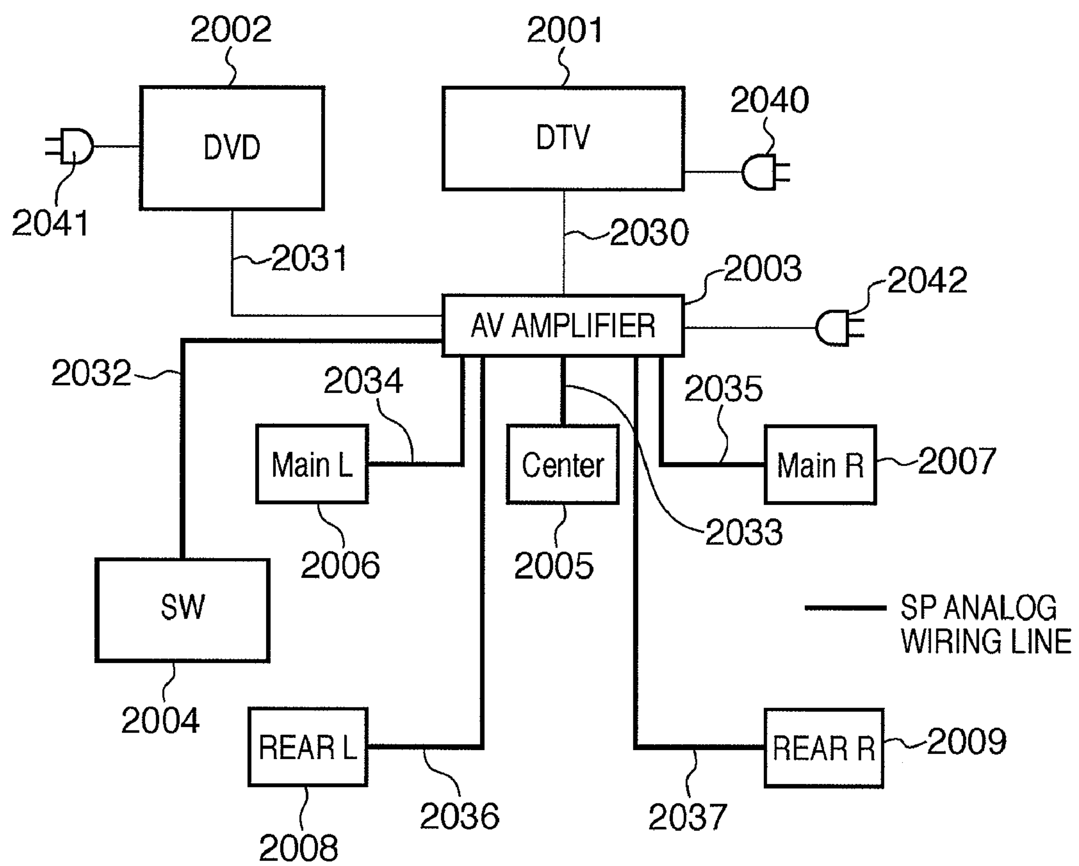
FIG. 20 is a block diagram showing the prior art of full wired wiring using analog speaker cables.

FIG. 19 is a sequence chart for explaining a control sequence between the communication controller and the communication adapter in transiting the digital amplifiers to a standby mode.

In step S1901, the communication controller 101 executes control to stop (turn off) the audio modulation output (stop step). In step S1902, the corresponding one of the communication adapters 102 to 107 stops generating the digital amplifier clock in response to the stop operation of the audio modulated data output by the communication controller 101. The corresponding one of the communication adapters 102 to 107 transits the digital amplifiers and their amplifier power supplies to a standby state (a standby state transition step).

Referring back to FIG. 8B, a reception command frame acquired in the command bandwidth separation BPF 808 is sent to a command demodulation circuit 810 via the RF amplifier 809. Since the reception audio modulation carrier virtually synchronizes with the reception command modulation carrier, a reception command modulation carrier playback PLL circuit denoted by reference numerals 811, 812, and 813 within the command demodulation circuit 810 can be omitted. In this case, a command clock playback circuit 817 supplies a 2.56-MHz reception command modulation carrier.

The reception command frame received from the RF amplifier 809 and the reception command modulation carrier received from the command clock playback circuit 817 are input to the command demodulation circuit 810. The reception command modulation carrier playback PLL circuit, denoted by reference numerals 811, 812, 813, a multiplier 814, and a low-pass filter 815 of the command demodulation circuit 810 generate a reception command frame based on the input reception command frame and reception command modulation carrier. The reception command frame demodulated by the command demodulation circuit 810 has the command frame structure explained with reference to FIG. 11. The reception command frame demodulated by the command demodulation circuit 810 is sent to a command extraction circuit 822.

The syscon 824 sets an address (To address) in the command extraction circuit 822 in advance. The command extraction circuit 822 extracts only a reception command destined to itself from the reception command frame, stores it in a buffer (storage unit), and transmits it to the syscon 824.

If a control code (see FIG. 14) contained in the control information of the reception audio transmission frame or the reception command is a command code (see FIG. 12) destined to the self adapter, the syscon 824 needs to return a response command to the communication controller 101. In this case, the syscon 824 confirms its command transmittable timing based on command arbitration information contained in the control information, and transmits a command at that timing. For example, the syscon 824 functions as a response command frame generation unit, and previously sets the contents of transmission command data (a response command frame) in a command frame generation circuit 821 to be ready for transmission. After that, the command frame generation circuit 821 transmits the command frame to a command modulation circuit 819 based on the self CH command transmittable timing contained in the control information extracted by the audio self CH signal extraction/self CH control information extraction circuit 820. This synchronizes transmission of the command frame with the reception audio transmission frame, and implements communication avoiding collision with the reception command frame.

The command modulation output of the command modulation circuit 819 undergoes band-pass processing at a BPF 818, and is sent to a cable drive power amplifier 805. The power amplifier 805 amplifies the output to a predetermined voltage level, and sends it to the multiplexing/demultiplexing circuit 803, and to the daisy wired input terminals 801 and pass-through output terminals 802. Since daisy cable wiring is matching-terminated only at the communication adapter of the final stage, a command modulated signal reliably reaches the communication controller 101.

FIG. 9 is a block diagram showing the detailed arrangement of the audio clock playback circuit 816 in FIG. 8A and the command clock playback circuit 817 in FIG. 8B.

Referring to FIG. 9, a 15.36-MHz PLL clock is an audio modulation carrier played back by the audio demodulator 850, from which a PLL circuit 902 generates a 122.88-MHz reference clock (source clock).

A 1/10 frequency divider 903 ("1/10" indicates a frequency dividing ratio) frequency-divides the source clock to obtain a 12.288-MHz clock, which corresponds to an audio data rate clock. A 1/256 frequency divider 905 ("1/256" indicates a frequency dividing ratio) frequency-divides the resultant clock to obtain a 48-KHz clock, which corresponds to an audio frame cycle. On the other hand, a 1/8 frequency divider 904 ("1/8" indicates a frequency dividing ratio) frequency-divides the source clock to obtain a 15.36-MHz clock, which corresponds to an audio modulation carrier clock. A 1/20 frequency divider 906 ("1/20" indicates a frequency dividing ratio) frequency-divides the resultant clock to obtain a 768-KHz clock, which is used as a digital amplifier clock.

As for the reception command frame, a PLL circuit 909 generates a 122.88-MHz reference clock (source clock) based on a 2.56-MHz PLL clock.

A 1/10 frequency divider 910 ("1/10" indicates a frequency dividing ratio) frequency-divides the source clock and a 1/256 frequency divider 912 ("1/256" indicates a frequency dividing ratio) frequency-divides the resultant. A 1/8 frequency divider 915 ("1/8" indicates a frequency dividing ratio) further frequency-divides the output of the frequency divider 912 to obtain a 6-KHz clock, which corresponds to a command frame cycle.

Furthermore, a 1/24 frequency divider 913 ("1/24" indicates a frequency dividing ratio) frequency-divides the output of the 1/10 frequency divider 910 to obtain a 0.512-MHz clock, which corresponds to a command data rate clock.

A 1/8 frequency divider 911 ("1/8" indicates a frequency dividing ratio) frequency-divides the source clock, and a 1/6 frequency divider 914 ("1/6" indicates a frequency dividing ratio) frequency-divides the resultant to obtain a 2.56-MHz clock, which corresponds to a command modulation carrier clock. The received audio transmission frame and the received command frame are processed based on the thus obtained various timing clocks.

As described above, according to the embodiment of the present invention, it is possible to reduce the total number of wiring lines of speaker cables and power supply wiring lines, thereby implementing a communication system capable of simplifying the wiring itself.

Since transmission of audio signals to speakers is digitized, it is possible to provide a communication system without performance degradation due to long wiring lines.

It is also possible to implement a communication system in which two-way command transmission is achieved and the communication controller side can grasp the status of each speaker.

Since a communication adapter on the playback device side can be configured by a simple modulation/demodulation circuit or the like without using any advanced-function CPU and time stamp-compatible hardware, it is possible to provide a low-cost communication system.

Other Embodiments

Note that the objects of the present invention are also achieved by supplying a computer-readable storage medium which records a program code of software that can implement the functions of the above-mentioned embodiments to a system or apparatus. Also, the objects can be achieved when a computer (or a CPU or MPU) of the system or apparatus reads out and executes the program code stored in the storage medium.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magnetooptical disk, CD-ROM, CD-R, nonvolatile memory card, ROM, and the like may be used.

The functions of the above-mentioned embodiments are implemented when the computer executes the readout program code. Also, the present invention includes a case in which the functions of the above-mentioned embodiments are implemented when an OS (operating system) running on the computer executes some or all of actual processes based on an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-143623, filed May 30, 2008, which is hereby incorporated by reference herein in its entirety.

What is claimed is:

1. A communication system comprising a communication controller for transmitting an audio signal, and a plurality of communication adapters for playing back the audio signal by a playback device, said communication controller comprising an audio data modulation unit configured to modulate audio data by shifting, based on a first modulation ratio, a modulation carrier for modulating the audio data and a data transmission rate of the audio data in order to set a command transmission frequency bandwidth, and a command data modulation unit configured to modulate command data by shifting, based on a second modulation ratio, a modulation carrier for modulating the command data and a data transmission rate of the command data in the command transmission frequency bandwidth set by said audio data modulation unit.

2. The system according to claim 1, wherein a ratio of a modulation carrier clock of the audio data and the data transmission rate of the audio data is (1+the first modulation ratio): 1.

3. The system according to claim 1, wherein said communication controller further includes a clock generation unit configured to generate a modulation carrier clock of the audio data by frequency-dividing a reference clock, and generate an inverted modulation carrier clock by inverting the modulation carrier clock, and said audio data modulation unit selects the modulation carrier clock or the inverted modulation carrier clock in accordance with high data or low data contained in audio data obtained by modulating the audio data, and outputs the modulated audio data.

4. The system according to claim 3, wherein said clock generation unit further generates a modulation carrier clock of the command data by frequency-dividing the reference clock, and generates an inverted modulation carrier clock by inverting the modulation carrier clock, and said command data modulation unit selects the modulation carrier clock or the inverted modulation carrier clock in accordance with high data or low data contained in command data obtained by modulating the command data, and outputs the modulated command data.

5. The system according to claim 4, wherein said clock generation unit generates a modulation carrier clock of the audio data based on a first frequency dividing ratio, and generates a modulation carrier clock of the command data based on a second frequency dividing ratio, from a signal reference clock.

6. The system according to claim 1, wherein a ratio of a modulation carrier clock of the command data and the data transmission rate of the command data is the second modulation ratio:1.

7. The system according to claim 1, wherein said communication controller further includes a transmission frame generation unit configured to generate a transmission frame containing audio data corresponding to a plurality of channels and control information for controlling processing of the audio data, and a command frame generation unit configured to generate a command frame which has command data communicated between said communication controller and said plurality of communication adapters, and is synchronous with the transmission frame, said audio data modulation unit modulates and outputs the transmission frame generated by said transmission frame generation unit, and said command data modulation unit modulates and outputs the command frame generated by said command frame generation unit.

8. The system according to claim 1, wherein each of said plurality of communication adapters includes a control information extraction unit configured to extract control information corresponding to said communication adapter from the transmission frame output by said audio data modulation unit of said controller, a command extraction unit configured to extract command data corresponding to said communication adapter from the command frame output by said command data modulation unit of said communication controller, and a response command frame generation unit configured to generate a response command frame in response to the command data extracted by said command extraction unit, and said response command frame generation unit controls an output timing of the response command frame based on the control information extracted by said control information extraction unit so as to avoid collision with reception of the command frame output from said communication controller.

9. The system according to claim 8, wherein each of said plurality of communication adapters further includes an input unit configured to accept input of an audio signal and power supply voltage which have been multiplexed and transmitted by said communication controller, an output unit configured to output, to a subsequent communication adapter, the audio signal and power supply voltage which have been accepted by said input unit, a connection detection unit configured to detect the presence/absence of connection with the subsequent communication adapter, and an output control unit configured to control output of said output unit based on a detection result of said connection detection unit.

10. A control method for a communication system which includes a communication controller for transmitting an audio signal, and a plurality of communication adapters for playing back the audio signal by a playback device, the method comprising:

a process executed in the communication controller, including a power supply voltage output step of turning on a power supply and outputting, to a communication adapter, only a power supply voltage supplied from the power supply, an audio modulated data output step of outputting audio modulated data to the communication adapter, and a command transmission step of transmitting a command to activate an amplifier of the communication adapter; and a process executed in the communication adapter, including an internal power supply driving step of turning on an internal power supply which drives parts except for a digital amplifier and amplifier power supply of the communication adapter in response to reception of the power supply voltage output in the power supply voltage output step, a digital amplifier clock generation step of generating a reference clock based on the audio modulated data output in the audio modulated data output step, and generating a digital amplifier clock for driving the digital amplifier based on the reference clock, an activation step of activating the digital amplifier and amplifier power supply in response to reception of the command output in the command transmission step, and a driving step of driving the digital amplifier using the digital amplifier clock generated in the digital amplifier clock generation step.

11. The method according to claim 10, wherein the process executed in the communication controller further includes a stop step of stopping output of the audio modulated data, and the process executed in the communication adapter further includes a standby state transition step of stopping generation of the digital amplifier clock in response to the stop operation of output of the audio modulated data in the stop step.

12. A program which is stored in a computer-readable storage medium, and causes a computer to execute the method according to claim 10.

13. A computer-readable storage medium for storing the program according to claim 12.

* * * * *